(12) United States Patent
Gupta

(10) Patent No.: US 8,971,183 B1
(45) Date of Patent: Mar. 3, 2015

(54) CONTROL SIGNAL TRAFFIC PROFILE BASED MOBILE APPLICATION ACCESS MANAGEMENT

(71) Applicant: Divyahans Gupta, San Jose, CA (US)

(72) Inventor: Divyahans Gupta, San Jose, CA (US)

( * ) Notice: Subject to any disclaimer, the term of this patent is extended or adjusted under 35 U.S.C. 154(b) by 58 days.

(21) Appl. No.: 14/020,859

(22) Filed: Sep. 8, 2013

(51) Int. Cl.
*H04W 4/00* (2009.01)
*H04J 3/14* (2006.01)
*H04W 28/06* (2009.01)
*H04W 52/02* (2009.01)

(52) U.S. Cl.
CPC .......... *H04W 28/06* (2013.01); *H04W 52/0212* (2013.01)
USPC ............ 370/230; 370/235; 370/329; 370/341

(58) Field of Classification Search
None
See application file for complete search history.

(56) References Cited

U.S. PATENT DOCUMENTS

| 2008/0242370 | A1 | 10/2008 | Lando et al. | |
|---|---|---|---|---|
| 2011/0131321 | A1 | 6/2011 | Black et al. | |
| 2012/0023236 | A1* | 1/2012 | Backholm et al. | 709/226 |
| 2012/0108225 | A1* | 5/2012 | Luna et al. | 455/418 |
| 2012/0129503 | A1* | 5/2012 | Lindeman et al. | 455/414.1 |
| 2012/0131184 | A1* | 5/2012 | Luna et al. | 709/224 |
| 2012/0131685 | A1* | 5/2012 | Broch et al. | 726/30 |
| 2012/0324091 | A9 | 12/2012 | Raleigh et al. | |
| 2013/0110636 | A1 | 5/2013 | Bott | |
| 2013/0145017 | A1* | 6/2013 | Luna | 709/224 |
| 2013/0205366 | A1* | 8/2013 | Luna et al. | 726/1 |
| 2014/0372622 | A1* | 12/2014 | Efrati | 709/228 |
| 2014/0372981 | A1* | 12/2014 | Said et al. | 717/121 |

FOREIGN PATENT DOCUMENTS

WO  WO2013086447 A1  6/2013

* cited by examiner

*Primary Examiner* — Chi H Pham
*Assistant Examiner* — Soon-Dong D Hyun
(74) *Attorney, Agent, or Firm* — Ash Tankha; Lipton, Weinberger & Husick

(57) ABSTRACT

A computer implemented method and system manages selective access of a mobile application to one of multiple networks based on a control signal traffic profile of the mobile application created by a profile creation component. A mobile application access component (MAAC) processes a control signal request transmitted by the mobile application to a service provider. The MAAC receives threshold limits for different modes of operation of the mobile application from a service entity. The MAAC accesses control signal traffic profile parameters defining the control signal traffic profile, embedded in the mobile application. The MAAC normalizes and compares the control signal traffic profile parameters of the mobile application with the threshold limits. The MAAC grants, terminates, or switches access of the mobile application to a network based on the comparison of the control signal traffic profile parameters with the threshold limits for associated modes of operation of the mobile application.

36 Claims, 10 Drawing Sheets

CONTROL SIGNAL TRAFFIC PROFILE BASED MOBILE APPLICATION ACCESS MANAGEMENT

BACKGROUND

With the evolution of mobile technologies for mass data communication, higher bandwidth allocation to data signals is achievable today. With the availability of higher bandwidth, data consumption by mobile applications has increased, which in turn has increased control signaling traffic attributed by these mobile applications. An increase in the number of users actively using these mobile applications has caused developers to develop a myriad of other mobile applications that further contribute to a rise in the control signaling traffic on wireless mobile networks. These mobile applications are provided for a fee or are free. Some of the mobile applications are paid by the users themselves, while other mobile applications are sponsored by various companies who are allowed to advertise in the mobile applications. Advertising in mobile applications requires constant data transmission between the mobile applications and their respective mobile application vendor stores. Thus, free or non-paid mobile applications in the internet market have aggravated the problem of increased control signaling traffic.

Mobile applications are changing the mobile communication industry. At present, both network carriers and handset manufacturers seek partnerships with application and content providers with the aim of differentiating their products and services. For a wireless mobile network, this implies more signaling and bandwidth challenges, in addition to other unsolved problems. There is no dearth of newer network architecture plans, for example, the fourth generation (4G) long term evolution (LTE) network being rolled out, that promise higher bandwidth to resolve this problem. However, these new technologies create additional control signaling traffic. Furthermore, increased usage of smart phones possessing broad network communication capabilities along with large screens and multiple different internet supported applications, for example, browsers, video streaming applications, audio streaming applications, etc., has resulted in an explosion of signaling traffic. To facilitate a mass migration from the wired world to a world where mobility is a necessity, which in turn necessitates network performance and user satisfaction at a higher level, there is a need for control signaling traffic optimization. Moreover, mobile applications constantly generate control signal traffic by checking for updates, even when the mobile application is not being actively used by a mobile user, that is, when the mobile application is running in the background.

Furthermore, popular mobile applications that become viral typically create large control signaling traffic storms. The adverse effect of these mobile applications on wireless mobile networks has made these mobile applications a topic of concern for many network carriers, for example, Verizon Communications Inc., American Telephone and Telegraph Company (AT&T), Nippon Telegraph and Telephone Corporation (NTT), etc. Moreover, mobile advertising in these mobile applications has aggravated the problem. Each time a player reaches a new level in a game via a mobile application on a mobile device, a mobile advertisement that requires a network connection is delivered.

Wireless mobile networks and infrastructure were typically developed to handle voice traffic. Network carriers built the wireless mobile networks to handle limited control signal traffic because voice signaling generated limited control signal traffic. However, with the advent of smart phones and tablet computing devices that support a myriad of internet supported applications, for example, gaming applications, social networking applications, voice calling applications, etc., the payload on the wireless mobile networks has increased substantially. User devices such as cell phones, smart phones, tablet computing devices, personal digital assistants, etc., create control signaling traffic in the form of control data packets and bearer data packets. These user devices with their internet supported applications generate massive chunks of control signaling traffic by repeatedly connecting and disconnecting with a wireless mobile network with or without a user's knowledge. This erratic communication of mobile applications with wireless mobile networks, in turn, rapidly depletes the battery life of a user device, thereby diminishing user experience.

When typical wireless mobile networks were implemented, minimal attention was given to requirements posed by rogue mobile applications. Such mobile applications include, for example, push electronic mail (email), instant messaging, visual voicemail, voice and video telephony, etc. These mobile applications typically require constant access to wireless mobile networks and frequently transmit control signals to the wireless mobile networks. Mobile and internet applications repeatedly connect and disconnect with the wireless mobile network in the background for various functions, for example, obtaining status updates, advertising, etc. Frequently transmitting data to the wireless mobile network also results in high battery consumption due to the constant need for powering or re-powering a radio of a user device for network access. Hence, repeated connections and control signaling traffic deplete battery life of the user device, thereby negatively impacting user experience. The data consumption strength of each mobile application is unique. While some mobile applications attribute to large volumes of control signaling traffic, some mobile applications contribute minimally towards control signaling traffic on the wireless mobile network depending on modes of operation of the mobile applications. For example, comparatively more control signaling traffic is caused by mobile applications in their active mode of operation rather than in their dormant or idle mode of operation. The larger the number of these mobile applications installed on a user device, the more is the control signaling traffic contributed by that user device on the wireless mobile network. Moreover, as the number of mobile users increase, the likelihood of control signaling traffic storms also increases. Since wireless mobile networks are built with limited traffic control capacity, control signaling traffic storms can cause mobile service outages as was experienced, for example, by Verizon, AT&T, and other network carriers around the globe in the past few years.

Network carriers over the years have been trying to combat network outages caused by overloading of wireless mobile networks. Traffic optimization is required to minimize control signaling traffic originating from mobile applications to ensure resource conservation. Some network carriers have suggested modifications of existing signaling protocols to reduce control signaling traffic. However, these modifications may require replacement of expensive service provider equipment and infrastructure. Moreover, such solutions may work only with equipment provided by a single mobile infrastructure equipment vendor, for example, Alcatel-Lucent, Ericsson, etc., while network carriers have equipment from multiple mobile infrastructure equipment vendors. A few other solutions suggested by network carriers include enhancing capacity of mobile infrastructure equipment, designing and implementing new signaling protocol designs, etc. However, all of these methods have proven to be time consuming, expensive, and inefficient.

Many mobile devices support third generation (3G) or fourth generation (4G) network access as well as WiFi® network access. Control signal traffic issues are more prevalent in the 3G or 4G network than in the Wi-Fi® network. High volume of control signal traffic has a disastrous effect on the 3G or 4G network, but not on the Wi-Fi® network. Feasible solutions that network carriers are leaning towards these days is offloading wireless mobile network users from a mobile telecommunication network, for example, a second generation (2G) network, the 3G network, the 4G LTE network, etc., to a wireless local area network, for example, a WiFi® network of the Wireless Ethernet Compatibility Alliance, Inc. By this transition, the network carriers can substantially increase bandwidth capacity in an affordable and flexible way. By offloading wireless mobile network users from the 3G or 4G network to the WiFi® network, network carriers can increase the capacity without the need to change equipment or the infrastructure. With the outburst of network outages attributed by control signal traffic growth, many network carriers have migrated to networking via the WiFi® network, thereby offloading control signal traffic. According to recent studies, an increasing portion of mobile traffic is being carried over the Wi-Fi® network. Even with the benefits of the 3G network, the 4G LTE network, etc., mobile users still opt for Wi-Fi® network access over its counterparts. Network carriers have built WiFi® offload networks proactively in areas with heavy mobile broadband usage, thereby enhancing user experience.

Wi-Fi® technology provides seamless roaming through the use of authentication of both a user device and a user by using the same subscriber identity module (SIM) as is used for authentication on a wireless mobile network. Moreover, this seamless experience can be further enhanced by providing service continuity through technology such as a mobile internet protocol (IP) to ensure that existing sessions such as voice communications and video streaming are not interrupted during a handover between wireless mobile networks. Quality of user experience can also be enhanced by dynamically reviewing performance of the connected wireless mobile network and making policy decisions on the user device, for example, whether to remain connected to the Wi-Fi® network to cater to highly congested Wi-Fi® networks. Furthermore, in some situations, a mobile user who accesses any internet enabled application on a user device may be interested in switching from the mobile telecommunication network, for example, 2G, 3G, 4G LTE, etc., to the Wi-Fi® network. In those situations, the user should be able to perform the handover in a hassle free manner, which can be ensured by network carriers.

Hence, there is a long felt but unresolved need for a computer implemented method and a computer implemented system that manage control signaling traffic contributed by mobile applications that cause congestion in a wireless mobile network, by managing selective access of each mobile application to the wireless mobile network. Moreover, there is need for a computer implemented method and a computer implemented system that optimize the control signaling traffic directed towards wireless mobile networks to avoid overloading of the wireless mobile networks. Furthermore, there is a need for a computer implemented method and a computer implemented system that monitor control signal traffic data of a mobile application in a user device in different modes of operation of the mobile application to prevent network congestion and excessive battery consumption of the user device, thereby ensuring an enhanced user experience. Furthermore, there is a need for an automated computer implemented method and a computer implemented system that offloads control signaling traffic from a mobile telecommunication network, for example, 2G, 3G, 4G LTE, etc., to a wireless local area network, for example, the WiFi® network with minimum manual interference.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and the computer implemented system disclosed herein address the above stated need for managing control signaling traffic contributed by mobile applications that cause congestion in a network, for example, a wireless mobile network, by managing selective access of each mobile application to the network. As used herein, the term "selective access" refers to access or non-access of a mobile application to a network. The term "selective access" may also refer to access of the mobile application switched from one network to a selected network. Moreover, the computer implemented method and the computer implemented system disclosed herein address the above stated need for optimizing the control signaling traffic directed towards wireless mobile networks to avoid overloading of the wireless mobile networks. Furthermore, the computer implemented method and the computer implemented system disclosed herein address the above stated need for monitoring control signal traffic data of a mobile application in a user device in different modes of operation of the mobile application to prevent network congestion and excessive battery consumption of the user device, thereby ensuring an enhanced user experience. Furthermore, the computer implemented method and the computer implemented system disclosed herein address the above stated need for offloading control signaling traffic from a mobile telecommunication network, for example, 2G, 3G, 4G LTE, etc., to a wireless local area network, for example, the WiFi® network with minimum manual interference.

The computer implemented method and the computer implemented system disclosed herein provide a profile creation component executable by at least one processor configured to create a control signal traffic profile for a mobile application for managing selective access of the mobile application to one of multiple networks, for example, a network that implements Wi-Fi® of the Wireless Ethernet Compatibility Alliance, Inc., a third generation (3G) mobile communication network, a fourth generation (4G) mobile communication network, a long term evolution (LTE) mobile communication network, etc., or a network formed from any combination of these networks. The profile creation component is configured to define control signal traffic profile parameters for different modes of operation of the mobile application. As used herein, the term "control signal traffic profile parameter" refers to a measurable factor defined in a predetermined system of units that stores data corresponding to control signals transmitted by a mobile application to a network, for example, to access updates of the mobile application hosted on the network by a mobile application vendor. The control signal traffic profile parameters indicate control signal traffic data of a mobile application, for example, the number of control signal requests that the mobile application submits to a network in different modes of operation. As used herein, the term "control signal" refers to a data signal that controls data transmission between entities, for example, user devices, mobile application vendors, service providers, etc., via a network. The control signal is measured as a number of data packets transmitted per unit time between the entities via the network. For example, a mobile application vendor transmits 10 control signals per hour to a user device implementing a mobile application to upgrade the mobile application installed on the user device. Also, as used herein, the term "control signal traffic data" refers to data associated with control signal traffic present in a network, generated by transmission of control signals between a transmitting entity, for example, a mobile application and a receiving entity, for example, a service provider of the network for controlling data transmission in the network. Also, as used herein, the term "service provider" refers to an entity that provides mobile communication network services, for example, global system for mobile communications (GSM) services, 3G services, 4G services, etc. Also, as used herein, the term "control signal request" refers to a data signal request that is transmitted by a mobile application of a user device to a service provider via a network to request for data associated with, for example, updates, audio/video quality indication, data synchronization, online advertisements, registration of the mobile application, etc. The control signal traffic profile parameters store control signal traffic data of the mobile application in different modes of operation of the mobile application. As used herein, the term "mode of operation" refers to an activity status of a device or a component of the device, for example, a mobile application, a user device, etc. The different modes of operation of the mobile application are, for example, an active mode of operation and a dormant mode of operation.

The profile creation component defines an active control signal traffic profile parameter for the mobile application in the active mode of operation of the mobile application and a dormant control signal traffic profile parameter for the mobile application in the dormant mode of operation of the mobile application. The active control signal traffic profile parameter is configured to store an aggregated value of the control signal traffic data per unit time for the mobile application in the active mode of operation. The dormant control signal traffic profile parameter is configured to store an aggregated value of the control signal traffic data per unit time for the mobile application in the dormant mode of operation. In an embodiment, the profile creation component defines the control signal traffic profile parameters for the different modes of operation of the mobile application by categorizing the control signal traffic profile parameters into classes. As used herein, the term "classes" refers to categories that categorize control signal traffic data of the mobile application. The classes are, for example, a low control signal traffic data class, a medium control signal traffic data class, a high control signal traffic data class, a normalized scale with a range, for example, from 1 to 10, or any combination thereof.

The profile creation component receives entity inputs from a service entity for defining the control signal traffic profile parameters for the different modes of operation of the mobile application. As used herein, the term "service entity" refers to an entity that provides one or more services related to mobile communication. The services comprise, for example, creation, development, manufacture, distribution, publication, and/or maintenance of mobile applications, networks, and associated devices. As used herein, the term "entity inputs" refers to instructions or inputs provided by a service entity, for example, an application developer, an application publisher, a mobile application vendor, a third party vendor, etc., for defining and embedding the control signal traffic profile parameters for a mobile application using an entity device, for example, a personal computer, a tablet computing device, a laptop, a personal digital assistant, etc. The profile creation component embeds the defined control signal traffic profile parameters in the mobile application for creating the control signal traffic profile for the mobile application. The control signal traffic profile parameters define the control signal traffic profile of the mobile application. The mobile application is therefore configured to selectively access one of the networks based on the created control signal traffic profile.

The computer implemented method and the computer implemented system disclosed herein further provides a mobile application access component executable by at least one processor configured to manage the selective access of the mobile application to one of the networks based on the control signal traffic profile of the mobile application. A user downloads the mobile application on a user device, for example, a mobile phone, a tablet computing device, a laptop, a personal digital assistant, etc. The mobile application transmits a control signal request to access one of the networks, to a service provider. For example, a mobile application transmits 10 data packets per minute to a network managed by a mobile application vendor to access updates of the mobile application hosted on the network by the mobile application vendor. A service entity defines threshold limits for the different modes of operation of the mobile application. The service entity is, for example, an application developer, an application publisher, a mobile application vendor, a mobile device vendor, a device manufacturer, a device operating system vendor, a service provider, a third party vendor, etc. Also, as used herein, the term "threshold limit" refers to a maximum amount of permissible data transmission by a mobile application via a network, beyond which access of the mobile application to the network is controlled by a service provider of the network to avoid network congestion.

The mobile application access component processes the control signal request transmitted by the mobile application to the service provider and receives threshold limits for the different modes of operation of the mobile application from the service entity via a network. The mobile application access component accesses control signal traffic profile parameters embedded in the mobile application. In an embodiment, the service provider of the network can also access the control signal traffic profile parameters of the mobile application via the mobile application access component. In an embodiment, the mobile application access component normalizes the received threshold limits for the different modes of operation of the mobile application with the accessed control signal traffic profile parameters of the mobile application in the associated modes of operation. For example, the mobile application access component normalizes the threshold limit for the active mode of operation of the mobile application with the active control signal traffic profile parameter of the mobile application, and normalizes the threshold limit for the dormant mode of operation of the mobile application with the dormant control signal traffic profile parameter of the mobile application. The mobile application access component compares the accessed control signal traffic profile parameters with the normalized threshold limits for the associated modes of operation of the mobile application.

The mobile application access component manages the selective access of the mobile application in the different modes of operation to one of the networks based on the comparison of the accessed control signal traffic profile parameters with the normalized threshold limits for the associated modes of operation of the mobile application. In an embodiment, the mobile application access component grants access of the mobile application in the different modes of operation to one of the networks, if the accessed control signal traffic profile parameters of the mobile application do not exceed the normalized threshold limits for the associated modes of operation of the mobile application. In another embodiment, the mobile application access component terminates access of the mobile application in the different modes of operation to one of the networks, if the accessed control signal traffic profile parameters of the mobile application exceed the normalized threshold limits for the associated modes of operation of the mobile application. In another embodiment, the mobile application access component switches access of the mobile application in the different modes of operation from one network to another network, if the accessed control signal traffic profile parameters of the mobile application exceed the normalized threshold limits for the associated modes of operation of the mobile application. In an embodiment, the mobile application access component generates and transmits notifications to the user device for indicating actions associated with the management of the selective access of the mobile application in the different modes of operation to one of the networks. The actions comprise, for example, granting access to a network, terminating access to the network, switching access from one network to another network, etc.

In an embodiment, the service entity defines a total threshold limit for each of the different modes of operation of multiple mobile applications implemented in the user device. As used herein, the term "total threshold limit" refers to an aggregate value of a maximum amount of permissible data transmission by multiple mobile applications via a network, beyond which access of one or more of the mobile applications to the network is controlled by a service provider of the network to avoid network congestion. In this embodiment, the mobile application access component receives the total threshold limit for each of the different modes of operation of multiple mobile applications implemented in the user device from the service entity. The mobile application access component determines a sum of the control signal traffic profile parameters embedded in the mobile applications for each of the associated modes of operation. In an embodiment, the mobile application access component normalizes the received total threshold limit for each of the different modes of operation of the mobile applications with the determined sum of the control signal traffic profile parameters of the mobile applications in the associated modes of operation. The mobile application access component compares the determined sum of the control signal traffic profile parameters for each of the associated modes of operation with the normalized total threshold limit for each of the associated modes of operation of the mobile applications. The mobile application access component grants access of the mobile applications in the different modes of operation to one of the networks, if the determined sum of the control signal traffic profile parameters of the mobile applications for each of the associated modes of operation does not exceed the normalized total threshold limit for each of the associated modes of operation of the mobile applications. The mobile application access component receives user inputs from the user device to terminate access of one or more of the mobile applications in the different modes of operation to one of the networks, if the determined sum of the control signal traffic profile parameters of the mobile applications exceeds the normalized total threshold limit for each of the associated modes of operation of the mobile applications. In an embodiment, the mobile application access component receives user inputs from the user device to switch access of one or more of the mobile applications in the different modes of operation from one network to another network, if the determined sum of the control signal traffic profile parameters of the mobile applications exceeds the normalized total threshold limit for each of the associated modes of operation of the mobile applications.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
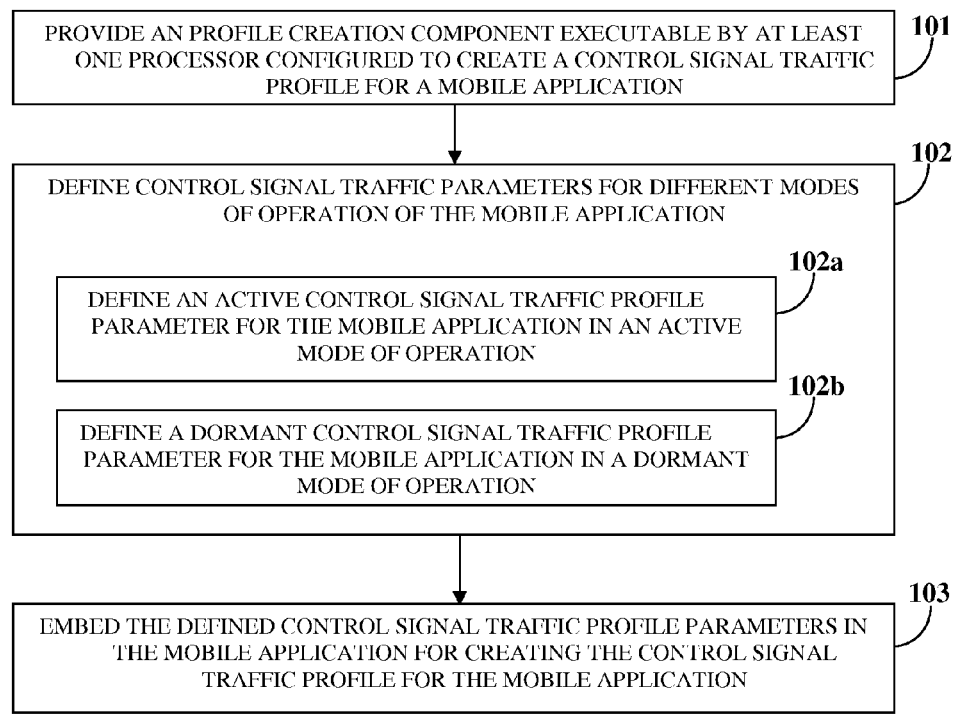
FIG. 1 illustrates a computer implemented method for creating a control signal traffic profile for a mobile application for managing selective access of the mobile application to one of multiple networks.

FIG. 1 illustrates a computer implemented method for creating a control signal traffic profile for a mobile application for managing selective access of the mobile application to one of multiple networks. As used herein, the term "selective access" refers to access or non-access of a mobile application to a network. The term "selective access" may also refer to access of the mobile application switched from one network to a selected network. The computer implemented method disclosed herein provides 101 a profile creation component executable by at least one processor configured to create the control signal traffic profile for the mobile application. The profile creation component is a software application used, for example, by an application developer for creating the control signal traffic profile for the mobile application. In an embodiment, the profile creation component is configured to operate, for example, as a software as a service (SaaS) accessible by a developer device via a network. In another embodiment, the profile creation component is hosted on a mobile application development platform accessible by the developer device via the network. As used herein, the term "developer device" refers to a computing device used by an application developer for developing the mobile application for a user device. The developer device is, for example, a personal computer, a tablet computing device, a mobile computer, a mobile phone, a smart phone, a portable computing device, a laptop, a personal digital assistant, a touch centric device, a workstation, a server, a client device, a portable electronic device, a network enabled computing device, an interactive network enabled communication device, any other suitable computing equipment, combinations of multiple pieces of computing equipment, etc. Computing equipment, for example, one or more servers may be associated with one or more online services. In an embodiment, the mobile application development platform is configured as a platform as a service (PaaS) or as a software as a service (SaaS). In another embodiment, the profile creation component is configured as a software application downloadable from the mobile application development platform and executable on the developer device.

The mobile application development platform is accessible to an application developer or a service entity, for example, through a broad spectrum of technologies and devices such as personal computers with access to the internet, internet enabled cellular phones, tablet computing devices, etc. As used herein, the term "service entity" refers to an entity that provides one or more services related to mobile communication. The services comprise, for example, creation, development, manufacture, distribution, publication, and/or maintenance of mobile applications, networks, and associated devices. The service entity is, for example, an application developer, an application publisher, a mobile application vendor, a mobile device vendor, a device manufacturer, a device operating system vendor, a service provider, a third party vendor, etc. The network for accessing the mobile application development platform is, for example, the internet, an intranet, a wireless network, a network that implements WiFi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) long term evolution (LTE) communication network, a public telephone network, etc., a local area network, a wide area network, an internet connection network, an infrared communication network, etc., or a network formed from any combination of these networks. In an embodiment, the mobile application development platform is implemented in a cloud computing environment. As used herein, the term" cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of configurable computing physical and logical resources. In an embodiment, a service entity, for example, an application developer can access the mobile application development platform via the network and download the profile creation component from the mobile application development platform on the developer device. In another embodiment, the mobile application development platform is pre-installed on the developer device to allow the application developer to access the profile creation component of the mobile application development platform on the developer device. The application developer accesses the profile creation component via his/her developer device for creating the control signal traffic profile for the mobile application. Although the detailed description refers to an application developer creating the control signal traffic profile for the mobile application, the control signal traffic profile may be created by any service entity, for example, an application publisher, a mobile application vendor, a third party vendor, etc.

The mobile application development platform is further configured to host a mobile application development module. In an embodiment, the mobile application development module is configured as a software application downloadable from the mobile application development platform and executable on the developer device. In another embodiment, the application developer accesses the mobile application development module of the mobile application development platform via the network. In an embodiment, the application developer first develops the mobile application using the mobile application development module. The application developer then creates the control signal traffic profile for the developed mobile application using the profile creation component. In another embodiment, the application developer creates the control signal traffic profile for an existing mobile application accessible to the developer device via the mobile application development platform.

The profile creation component defines 102 control signal traffic profile parameters for different modes of operation of the mobile application. As used herein, the term "control signal traffic profile parameter" refers to a measurable factor defined in a predetermined system of units that stores data corresponding to control signals transmitted by a mobile application to a network, for example, to access updates of the mobile application hosted on the network by a mobile application vendor. Also, as used herein, the term "control signal" refers to a data signal that controls data transmission between entities, for example, user devices, mobile application vendors, service providers, etc., via a network. The control signal is measured as a number of data packets transmitted per unit time between the entities via the network. For example, a mobile application vendor transmits 10 control signals per hour to a mobile device implementing the mobile application to upgrade the mobile application installed on the mobile device. The control signal traffic profile parameters indicate control signal traffic data of a mobile application, for example, the number of control signal requests that the mobile application submits to a network in different modes of operation. As used herein, the term "control signal traffic data" refers to data associated with control signal traffic present in a network, generated by transmission of control signals between a transmitting entity, for example, a mobile application and a receiving entity, for example, a service provider of the network for controlling data transmission in the network. Also, as used herein, the term "service provider" refers to an entity that provides mobile communication network services, for example, global system for mobile communications (GSM) services, 3G services, 4G services, etc. Also, as used herein, the term "mode of operation" refers to an activity status of a device or a component of the device, for example, a mobile application, a user device, etc. The different modes of operation of the mobile application are, for example, an active mode of operation and a dormant mode of operation. The active mode of operation of the mobile application is the activity status of the mobile application when the mobile application is being actively used by a user via a graphical user interface (GUI) of the mobile application. The dormant mode of operation of the mobile application is the activity status of the mobile application when the mobile application is not being actively used by the user via the GUI of the mobile application.

The user device implementing the mobile application is, for example, a personal computer, a tablet computing device, a mobile computer, a mobile phone, a smart phone, a gaming device, an image capture device, a portable computing device, a laptop, a personal digital assistant, a touch centric device, a client device, a portable electronic device, a network enabled computing device, an interactive network enabled communication device, etc., any other suitable computing equipment, combinations of multiple pieces of computing equipment, etc. The user device may also be a hybrid device that combines the functionality of multiple devices. Examples of a hybrid device comprise a cellular telephone that includes media player functionality, a gaming device that includes a wireless communications capability, a cellular telephone that includes game and electronic mail (email) functions, and a portable device that receives email, supports mobile telephone calls, has music player functionality, and supports web browsing.

The control signal traffic profile parameters are configured to store control signal traffic data of the mobile application in the different modes of operation. In an embodiment, the control signal traffic data is, for example, a number of data packets transmitted from the mobile application implemented on the user device in the different modes of operation to one of the networks per unit time. In another embodiment, the control signal traffic data is, for example, a number of control signal requests transmitted from the mobile application in the different modes of operation to one of the networks to request access to one of the networks. The profile creation component defines 102 the control signal traffic profile parameters for the different modes of operation of the mobile application, for example, by defining 102a an active control signal traffic profile parameter for the mobile application in the active mode of operation of the mobile application, and by defining 102b a dormant control signal traffic profile parameter for the mobile application in the dormant mode of operation of the mobile application. The active control signal traffic profile parameter is configured to store an aggregated value of the control signal traffic data per unit time for the mobile application in the active mode of operation. In an embodiment, the active control signal traffic profile parameter is an average or a maximum number of control signal requests per unit time generated by the mobile application when the mobile application is actively used by the user device. In this embodiment, the system of units for time to define the active control signal traffic profile parameter can be selected from a range of, for example, 10 minutes, 1 hour, etc.

The dormant control signal traffic profile parameter is configured to store an aggregated value of the control signal traffic data per unit time for the mobile application in the dormant mode of operation. In an embodiment, the dormant control signal traffic profile parameter is an average or a maximum number of control signal requests per unit time generated by the mobile application when the mobile application is not actively used by the user device. In this embodiment, the system of units for time to define the dormant control signal traffic profile parameter can be selected from a range of, for example, 10 minutes, 1 hour, etc. In an example, if the mobile application being actively used by the user device transmits 20 control signal requests to one of the networks in a duration of 1 hour, the profile creation component defines the active control signal traffic profile parameter for the mobile application as 20 control signal requests per hour. Similarly, if the mobile application that is not actively used by the user device transmits 5 control signal requests to one of the networks in a duration of 1 hour, the profile creation component defines the dormant control signal traffic profile parameter for the mobile application as 5 control signal requests per hour. In an embodiment, the profile creation component defines the control signal traffic profile parameters for the different modes of operation of the mobile application by categorizing the control signal traffic profile parameters into classes instead of precise values of the control signal traffic data per unit time. As used herein, the term "classes" refers to multiple categories that categorize control signal traffic data of the mobile application. The classes are, for example, 3 classes such as a low control signal traffic data class, a medium control signal traffic data class, and a high control signal traffic data class, or 5 classes such as a very low control signal traffic data class, a low control signal traffic data class, a medium control signal traffic data class, a high control signal traffic data class, and a very high control signal traffic data class, or a normalized scale with a range, for example, from 1 to 10, or any combination thereof.

A service entity accesses the profile creation component hosted on the mobile application development platform via the GUI of the profile creation component. The profile creation component allows the service entity, for example, an application developer, an application publisher, a mobile application vendor, a third party vendor, etc., to test and analyze the control signal traffic data of the mobile application in the different modes of operation. The service entity defines the control signal traffic profile parameters of the mobile application in the different modes of operation via the GUI of the profile creation component. The profile creation component receives entity inputs for the definition of the control signal traffic profile parameters for the different modes of operation of the mobile application from an entity device of the service entity. As used herein, the term "entity inputs" refers to instructions or inputs provided by a service entity, for example, an application developer, an application publisher, a mobile application vendor, a third party vendor, etc., for defining and embedding the control signal traffic profile parameters in a mobile application using an entity device. Also, as used herein, the term "entity device" refers to a computing device used by a service entity for defining and embedding the control signal traffic profile parameters in a mobile application. The entity device is, for example, a personal computer, a tablet computing device, a mobile computer, a mobile phone, a smart phone, a portable computing device, a laptop, a personal digital assistant, a touch centric device, a workstation, a server, a client device, a portable electronic device, a network enabled computing device, an interactive network enabled communication device, any other suitable computing equipment, combinations of multiple pieces of computing equipment, etc.

The profile creation component embeds 103 the defined control signal traffic profile parameters in the mobile application for creating the control signal traffic profile for the mobile application. The mobile application is configured to selectively access one of the networks, for example, the WiFi® network, the 3G or 4G mobile communication network, etc., based on the created control signal traffic profile of the mobile application. In an embodiment, the mobile application with the embedded the control signal traffic profile parameters is stored on the mobile application development platform via a network for allowing user devices to download the control signal traffic profile based mobile application. In an embodiment, the control signal traffic profile of the mobile application is a set of two numbers assigned to the mobile application. The service provider of one of the networks and a mobile application access component disclosed in the detailed description of FIG. 2, in operative communication with an operating system of the user device implementing the mobile application, ensure that the mobile application has the control signal traffic profile in order to access one of the networks. The control signal traffic profile of the mobile application is automatically enabled when the mobile application attempts to access one of the networks.

Figure 2:
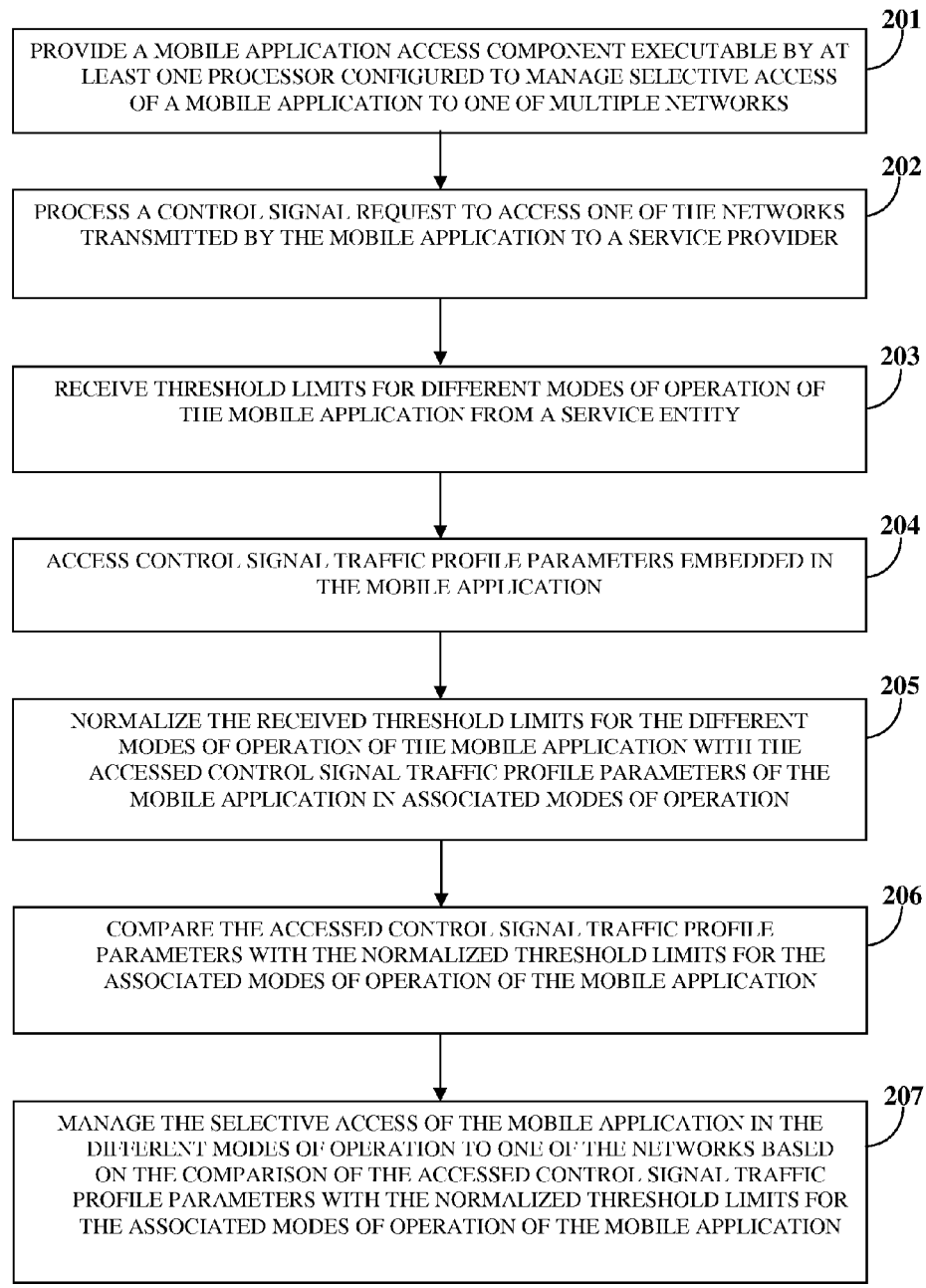
FIG. 2 illustrates a computer implemented method for managing selective access of a mobile application to one of multiple networks based on the control signal traffic profile of the mobile application.

FIG. 2 illustrates a computer implemented method for managing selective access of a mobile application to one of multiple networks based on the control signal traffic profile of the mobile application. The mobile application implemented in the user device may selectively access one of the networks, for example, a wireless network, a network that implements Wi-Fi® of the Wireless Ethernet Compatibility Alliance, Inc., a second generation (2G) mobile communication network, a third generation (3G) mobile communication network, a fourth generation (4G) mobile communication network, etc., or a network formed from any combination of these networks. The computer implemented method disclosed herein provides 201 a mobile application access component executable by at least one processor configured to manage the selective access of the mobile application to one of the networks. The mobile application access component is a software application that programs an operating system of the user device to manage selective access of the mobile application to one of the networks. In an embodiment, the mobile application access component is configured as a software as a service (SaaS) accessible by the user device via a network. In another embodiment, the mobile application access component is downloadable and executable on the user device.

The mobile application access component is in operative communication with the operating system of the user device that implements the mobile application. The operating system of the user device is, for example, the iOS® of Apple Inc., the Android operating system, the Blackberry® operating system of Research in Motion Limited, the Windows Phone® operating system of Microsoft Corporation, etc. In an embodiment, the mobile application access component, in operative communication with the operating system of the user device, is accessible by a service entity, for example, an operating system vendor, a service provider, a user device vendor, a third party vendor, and any combination thereof, via a network. A user downloads and installs the control signal traffic profile based mobile application on the user device, for example, from the mobile application development platform via a network. The mobile application with the embedded control signal traffic profile parameters transmits a control signal request to a service provider hosting a network to gain access to the network. As used herein, the term "control signal request" refers to a data signal request that is transmitted by a mobile application of a user device to a service provider via a network to request for data associated with, for example, updates, audio/video quality indication, data synchronization, online advertisements, registration of the mobile application, etc.

The mobile application access component processes 202 the control signal request transmitted by the mobile application to the service provider of the network. The mobile application access component communicates with the service provider of the network. The mobile application access component receives 203 threshold limits for different modes of operation of the mobile application from a service entity, for example, the service provider, a device operating system vendor, a mobile device vendor, etc., via the network. As used herein, the term "threshold limit" refers to a maximum amount of permissible data transmission by a mobile application via a network, beyond which access of the mobile application to the network is controlled by a service provider of the network to avoid network congestion. The threshold limit is, for example, a maximum number of control signal requests that are permitted by the service provider of a network to be transmitted from the mobile application in the different modes of operation to the network. In an example, if the mobile application is in the dormant mode of operation, the mobile application access component receives the threshold limit for the dormant mode of operation of the mobile application, for example, from the service provider, and/or the device operating system vendor, and/or the mobile device vendor to allow or restrict access of the mobile application to one of the networks. Similarly, if the mobile application is in the active mode of operation, the mobile application access component receives the threshold limit for the active mode of operation of the mobile application, for example, from the service provider, and/or the device operating system vendor, and/or the mobile device vendor to allow or restrict access of the mobile application to one of the networks.

The mobile application access component accesses 204 the control signal traffic profile parameters, for example, the active control signal traffic profile parameter and the dormant control signal traffic profile parameter, defining the control signal traffic profile, embedded in the mobile application. In an embodiment, if the accessed control signal traffic profile parameters of the mobile application in the different modes of operation are in a different system of units as compared to the system of units of the threshold limits for the different modes of operation of the mobile application received from the service entity, the mobile application access component normalizes 205 the received threshold limits for the different modes of operation of the mobile application with the accessed control signal traffic profile parameters of the mobile application in associated modes of operation. For example, the mobile application access component normalizes the received threshold limit for the active mode of operation of the mobile application with the accessed active control signal traffic profile parameter of the mobile application, if the received threshold limit is in a different system of units as compared to the system of units of the accessed active control signal traffic profile parameter of the mobile application. Similarly, the mobile application access component normalizes the received threshold limit for the dormant mode of operation of the mobile application with the accessed dormant control signal traffic profile parameter of the mobile application, if the received threshold limit for the dormant mode of operation is in a different system of units as compared to the system of units of the accessed dormant control signal traffic profile parameter of the mobile application. Consider an example where the active control signal traffic profile parameter for the mobile application is 300 control signal requests per hour and the threshold limit received from the service entity for the active mode of operation of the mobile application is 4 control signal requests per minute. In this example, the mobile application access component normalizes the received threshold limit for the active mode of operation of the mobile application with the accessed active control signal traffic profile parameter of the mobile application. That is, the mobile application access component normalizes the threshold limit for the active mode of operation of the mobile application to 240 control signal requests per hour.

In an embodiment, the mobile application access component normalizes the control signal traffic profile parameters of the mobile application in different modes of operation with the received threshold limits for the associated modes of operation of the mobile application. Consider an example where the active control signal traffic profile parameter for the mobile application is 60 control signal requests per minute and the threshold limit received from the service entity for the active mode of operation of the mobile application is 240 control signal requests per hour. In this example, the mobile application access component normalizes the active control signal traffic profile parameter of the mobile application with the received threshold limit for the active mode of operation of the mobile application. That is, the mobile application access component normalizes or converts the active control signal traffic profile parameter to 3600 control signal requests per hour.

The mobile application access component compares 206 the accessed control signal traffic profile parameters with the normalized threshold limits for the associated modes of operation of the mobile application. In an embodiment, the mobile application access component performs a dynamic comparison of the accessed control signal traffic profile parameters with the normalized threshold limits for the associated modes of operation of the mobile application. The mobile application access component manages 207 the selective access of the mobile application in the different modes of operation to one of the networks based on the comparison of the accessed control signal traffic profile parameters with the normalized threshold limits for the associated modes of operation of the mobile application. In an embodiment, the mobile application access component grants access of the mobile application in the different modes of operation to one of the networks, if the accessed control signal traffic profile parameters of the mobile application do not exceed the normalized threshold limits for the associated modes of operation. For example, if the accessed active control signal traffic profile parameter of the mobile application is less than the normalized threshold limit for the active mode of operation of the mobile application, the mobile application access component grants access of the mobile application in the active mode of operation to one of the networks. Similarly, if the accessed dormant control signal traffic profile parameter of the mobile application is less than the normalized threshold limit for the dormant mode of operation of the mobile application, the mobile application access component grants access of the mobile application in the dormant mode of operation to one of the networks. Hence, the mobile application access component, in operative communication with the operating system of the user device, enforces that the active control signal traffic profile parameter and the dormant control signal traffic profile parameter of the mobile application are less than the normalized threshold limits for the different modes of operation of the mobile application to allow the mobile application to access one of the networks.

In another embodiment, the mobile application access component terminates access of the mobile application in the different modes of operation to one of the networks, if the accessed control signal traffic profile parameters of the mobile application exceed the normalized threshold limits for the associated modes of operation. For example, if the active control signal traffic profile parameter of the mobile application is greater than the normalized threshold limit for the active mode of operation of the mobile application, the mobile application access component terminates access of the mobile application in the active mode of operation to one of the networks. Similarly, if the dormant control signal traffic profile parameter of the mobile application is greater than the normalized threshold limit for the dormant mode of operation of the mobile application, the mobile application access component terminates the access of the mobile application in the dormant mode of operation to one of the networks. In the above example, the normalized threshold limit for the active mode of operation of the mobile application is 240 control signal requests per hour and the active control signal traffic profile parameter is 300 control signal requests per hour. Since the active control signal traffic profile parameter in the above example is greater than the normalized threshold limit for the active mode of operation of the mobile application, the mobile application access component terminates access of the mobile application to one of the networks, thereby preventing overloading resulting in a network outage at the service provider's network. The mobile application is not permitted to access the network as long as the active control signal traffic profile parameter is greater than the normalized threshold limit for the active mode of operation of the mobile application. In an embodiment, the mobile application access component generates and transmits notifications to the user device for indicating actions associated with the management of the selective access of the mobile application in the different modes of operation to one of the networks. For example, the mobile application access component generates and transmits a notification to the user device on granting the access of the mobile application to one of the networks. In an embodiment, the mobile application access component generates and transmits a notification to the user device only on terminating the access of the mobile application to one of the networks.

In an embodiment, the mobile application access component switches the access of the mobile application in the different modes of operation from one network to another network, if the accessed control signal traffic profile parameters of the mobile application exceed the normalized threshold limits for the associated modes of operation. In this embodiment, the mobile application access component, on terminating the access of the mobile application in the different modes of operation, subsequently prompts the user to select another network via a notification transmitted to the user device by the mobile application access component. For example, the mobile application access component, on terminating the access of the mobile application in the different modes of operation, generates and transmits a notification to the user device with a list of other available networks to allow the user to switch the access of the mobile application from one of the networks to one of the other available networks. In this example, the mobile application access component transmits a notification to the user device indicating the access of the mobile application switched from one network to another network.

In an embodiment, the mobile application access component receives a total threshold limit for each of the different modes of operation of multiple mobile applications implemented in the user device from the service entity, for example, a service provider, a device operating system vendor, a mobile device vendor, etc., via the network. As used herein, the term "total threshold limit" refers to an aggregate value of a maximum amount of permissible data transmission by multiple mobile applications via a network, beyond which access of one or more of the mobile applications to the network is controlled by a service provider of the network to avoid network congestion. For example, if the user device implements 10 mobile applications communicating with the same network, then the service entity, for example, the service provider of the network accesses the control signal traffic profile parameters embedded in each of the mobile applications in the different modes of operation and determines the total threshold limit for 10 mobile applications in each of the different modes of operation. That is, the mobile application access component determines one total threshold limit for 10 mobile applications in the active mode of operation and another total threshold limit for the 10 mobile applications in the dormant mode of operation. The service provider transmits the determined total threshold limit for each of the different modes of operation of the mobile applications to the mobile application access component on the user device via the network. The mobile application access component determines a sum of the control signal traffic profile parameters embedded in the mobile applications for each of the associated modes of operation. For example, if the user device implements 5 mobile applications communicating with the same network, the mobile application access component determines one sum of the active control signal traffic profile parameters embedded in the 5 mobile applications for the active mode of operation, and another sum of the dormant control signal traffic profile parameters embedded in the 5 mobile applications for the dormant mode of operation.

In an embodiment, the mobile application access component normalizes the received total threshold limit for each of the different modes of operation of the mobile applications with the determined sum of the control signal traffic profile parameters of the mobile applications in the associated modes of operation. For example, the mobile application access component normalizes the received total threshold limit for the active mode of operation of the mobile applications with the determined sum of the active control signal traffic profile parameters of the mobile applications. Similarly, the mobile application access component normalizes the received total threshold limit for the dormant mode of operation of the mobile applications with the determined sum of the dormant control signal traffic profile parameters of the mobile applications. The mobile application access component compares the determined sum of the control signal traffic profile parameters for each of the associated modes of operation with the normalized total threshold limit for each of the associated modes of operation of the mobile applications. For example, the mobile application access component compares the determined sum of the active control signal traffic profile parameters of the mobile applications with the normalized total threshold limit for the active mode of operation of the mobile applications. Similarly, the mobile application access component compares the determined sum of the dormant control signal traffic profile parameters of the mobile applications with the normalized total threshold limit for the dormant mode of operation of the mobile applications.

The mobile application access component grants access of the mobile applications in the different modes of operation to one of the networks, if the determined sum of the control signal traffic profile parameters of the mobile applications for each of the associated modes of operation does not exceed the normalized total threshold limit for each of the associated modes of operation of the mobile applications. For example, the mobile application access component grants access of the mobile applications in the active mode of operation to one of the networks, if the determined sum of the active control signal traffic profile parameters of the mobile applications does not exceed the normalized total threshold limit for the active mode of operation of the mobile applications. Similarly, the mobile application access component grants access of the mobile applications in the dormant mode of operation to one of the networks, if the determined sum of the dormant control signal traffic profile parameters of the mobile applications does not exceed the normalized total threshold limit for the dormant mode of operation of the mobile applications.

In an embodiment, the mobile application access component generates and transmits notifications to the user device for indicating a list of the mobile applications accessing one of the networks based on the comparison of the determined sum of the control signal traffic profile parameters embedded in the mobile applications with the normalized total threshold limit for each of the different modes of operation of the mobile applications. The user can select one or more mobile applications from the list of the mobile applications generated by the mobile application access component. The user provides user inputs to the mobile application access component to terminate the access of the selected mobile applications in the different modes of operation to one of the networks, if the determined sum of the control signal traffic profile parameters of the mobile applications exceeds the normalized total threshold limit for each of the associated modes of operation of the mobile applications. The mobile application access component receives the user inputs from the user device to terminate the access of one or more of the mobile applications in the different modes of operation to one of the networks.

In an embodiment, the mobile application access component receives user inputs from the user device to switch the access of one or more of the mobile applications in the different modes of operation from one network to another network, if the determined sum of the control signal traffic profile parameters of the mobile applications exceeds the normalized total threshold limit for each of the associated modes of operation of the mobile applications.

Hence, the computer implemented method disclosed herein provides a practical and achievable solution to the existing control signal traffic issues in a service provider network without the need for complex, expensive, and time consuming service provider infrastructure changes or updates. The computer implemented method disclosed herein only requires an update of the mobile application implemented in the user device and/or the operating system of the user device by a service entity, for example, the application developer, the application publisher, etc. The computer implemented method disclosed herein restricts rogue applications that create heavy control signal traffic. The computer implemented method disclosed herein can be implemented on any user device irrespective of the make or type of the user device or the operating system of the user device.

Figure 3A:
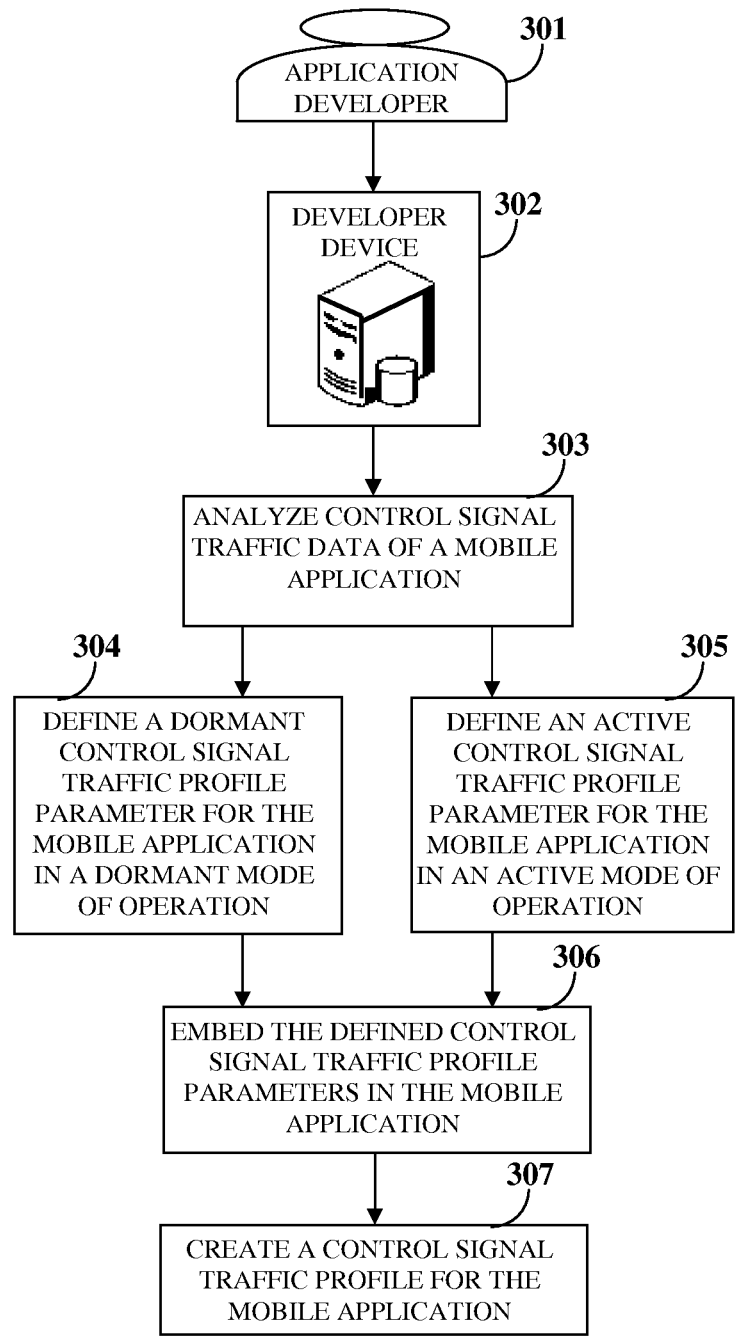
FIGS. 3A-3F exemplarily illustrate a process flow diagram comprising the steps for managing selective access of a mobile application to one of multiple networks based on the control signal traffic profile of the mobile application.
Figure 3B:
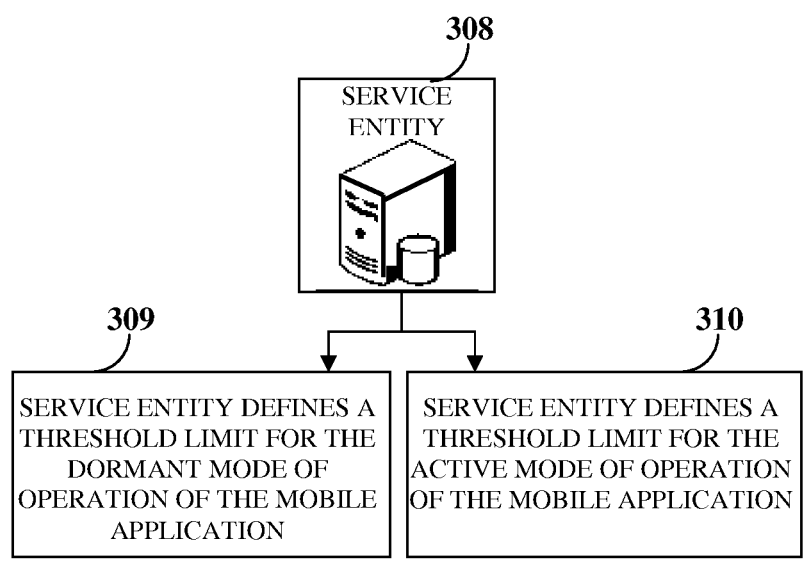
Figure 3C:
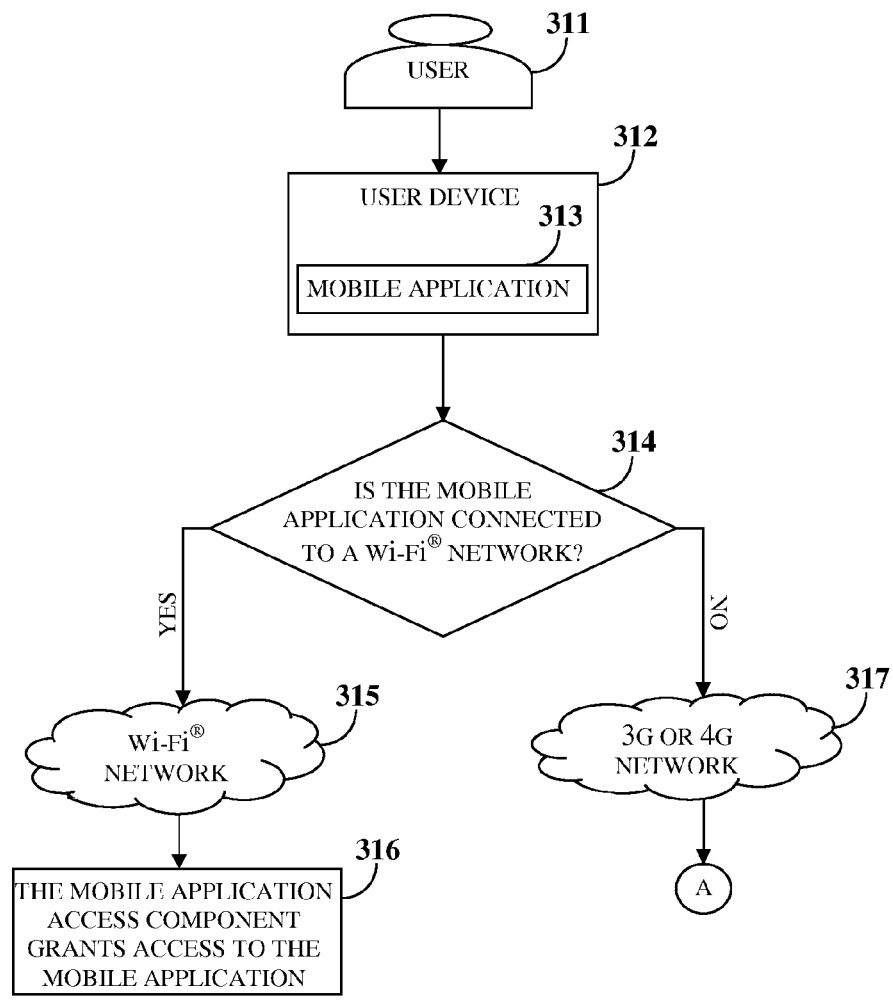

FIGS. 3A-3F exemplarily illustrate a process flow diagram comprising the steps for managing selective access of a mobile application 313 exemplarily illustrated in FIG. 3C to one of multiple networks, for example, a WiFi® network 315, a third generation (3G) network or a fourth generation (4G) network 317, etc., based on the control signal traffic profile of the mobile application 313. FIG. 3A exemplarily illustrates the steps performed by the profile creation component for creating the control signal traffic profile of the mobile application 313 exemplarily illustrated in FIG. 3C. An application developer 301 registers with and logs into the mobile application development platform using a developer device 302 to access the profile creation component. The profile creation component allows the application developer 301 to analyze 303 the control signal traffic data of the mobile application 313 that accesses one of the networks, for example, 315, 317, etc., in different modes of operation of the mobile application 313. The profile creation component then allows the application developer 301 to define the control signal traffic profile parameters for the mobile application 313 in the different modes of operation based on the analysis of the control signal traffic data of the mobile application 313. The application developer 301 via the profile creation component defines 304 a dormant control signal traffic profile parameter for the mobile application 313 in a dormant mode of operation. Furthermore, the application developer 301 via the profile creation component defines 305 an active control signal traffic profile parameter for the mobile application 313 in an active mode of operation. The profile creation component embeds 306 the defined control signal traffic profile parameters in the mobile application 313, thereby creating 307 the control signal traffic profile for the mobile application 313. In an embodiment, the application developer 301 creates the control signal traffic profile for each of multiple mobile applications implemented in a user device 312 exemplarily illustrated in FIG. 3C. In this embodiment, each mobile application 313 of the user device 312 has a control signal traffic profile of its own.

FIG. 3B exemplarily illustrates the steps performed by a service entity 308, for example, a service provider, a device operating system vendor, a mobile device vendor, etc., for defining threshold limits for the different modes of operation of the mobile application 313 exemplarily illustrated in FIG. 3C, that determine whether the mobile application 313 can access a network, for example, the 3G or 4G network 317 exemplarily illustrated in FIG. 3C. The service entity 308, for example, a service provider defines the threshold limits for the different modes of operation of the mobile application 313 to prevent network congestion at the 3G or 4G network 317 of the service provider caused by control signaling traffic attributed by the control signal requests transmitted by the mobile application 313 in the different modes of operation to the service provider. As exemplarily illustrated in FIG. 3B, the service entity 308 defines 309 a threshold limit for the dormant mode of operation of the mobile application 313. Furthermore, the service entity 308 defines 310 a threshold limit for the active mode of operation of the mobile application 313.

FIG. 3C exemplarily illustrates the steps performed by a user 311 using the user device 312 for accessing one of the networks, for example, the WiFi® network 315 or the 3G or 4G network 317. The user 311 downloads the mobile application 313 embedded with the control signal traffic profile parameters on the user device 312. The mobile application 313 connects to one of the networks, for example, 315, 317, etc. In an embodiment, the user 311 using the user device 312 can select the access of the mobile application 313 to one of the networks, for example, 315, 317, etc. In another embodiment, the mobile application access component implemented in the user device 312 selects the access of the mobile application 313 to one of the networks, for example, 315, 317, etc., as disclosed in the detailed description of FIG. 2. The mobile application access component checks 314 whether the mobile application 313 is connected to the Wi-Fi® network 315. If the mobile application 313 connects to the Wi-Fi® network 315, the mobile application access component grants 316 the access of the mobile application 313 in the different modes of operation to the Wi-Fi® network 315 directly, as the Wi-Fi® network 315 is not affected by heavy control signaling traffic caused by the control signals requests transmitted by the mobile application 313 to the Wi-Fi® network 315. If the mobile application 313 is not connected to the Wi-Fi® network 315, the mobile application access component determines that the mobile application 313 has connected to another network, for example, the 3G or 4G network 317 and proceeds with the steps disclosed in the detailed description of FIGS. 3D-3F.

Figure 3D:
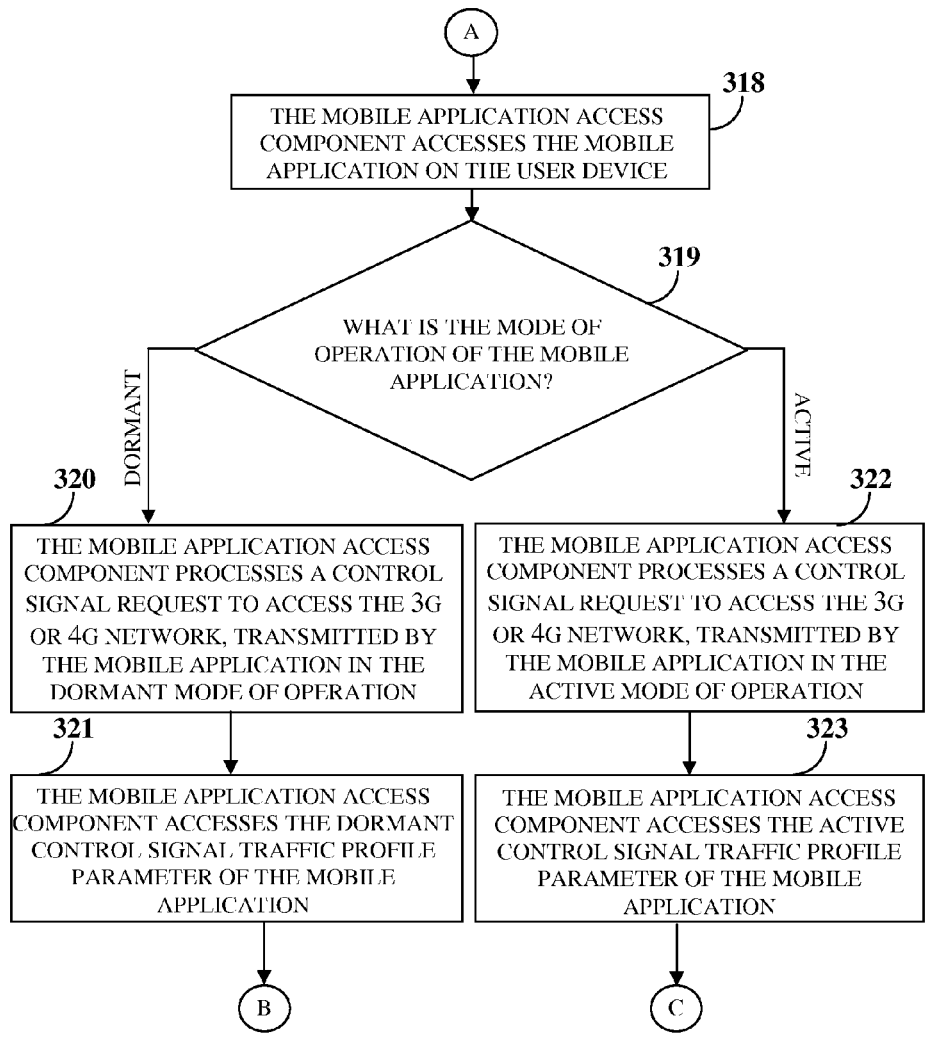
Figure 3E:
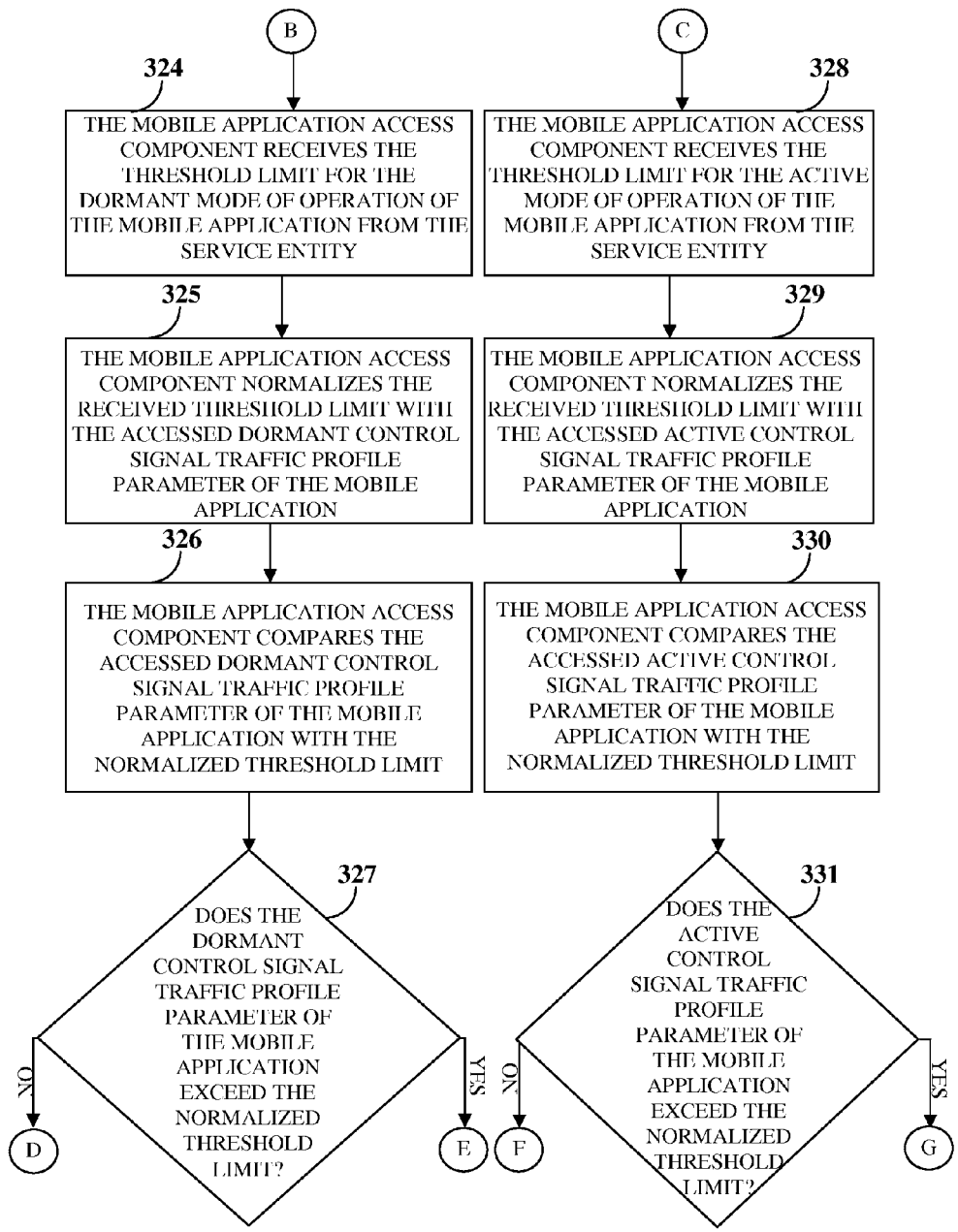
Figure 3F:
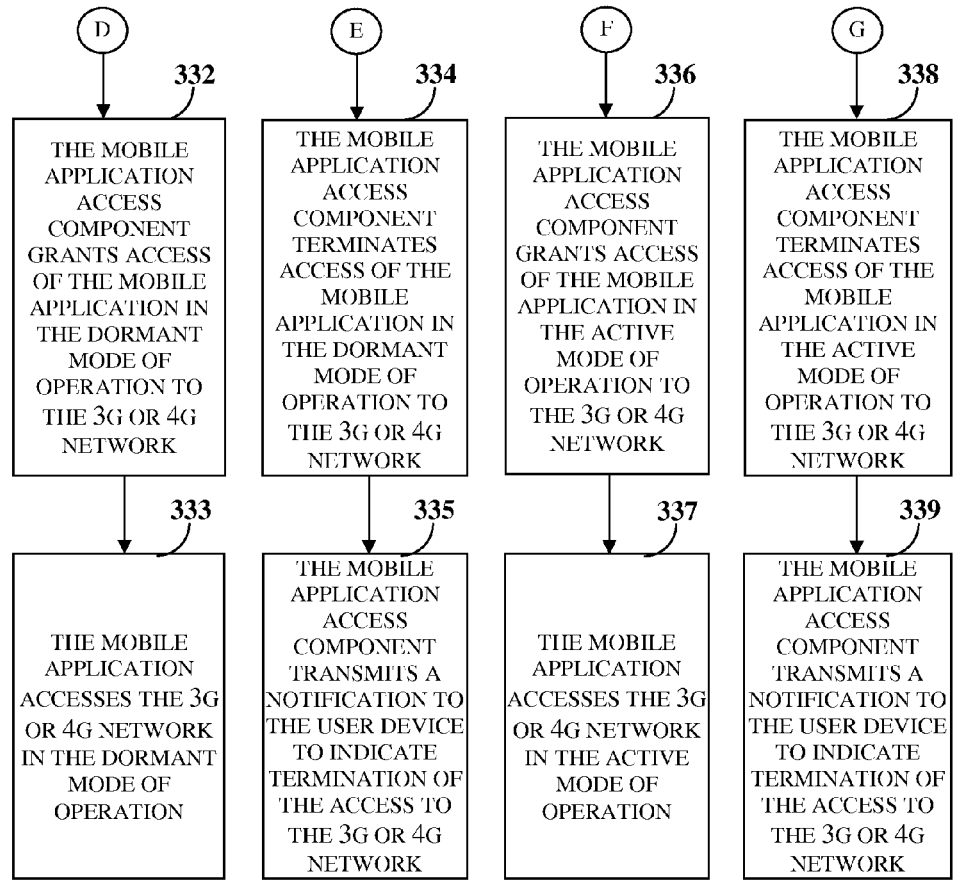

FIGS. 3D-3F exemplarily illustrate the steps performed by the mobile application access component for managing the selective access of the mobile application 313 exemplarily illustrated in FIG. 3C, to the 3G or 4G network 317 based on the control signal traffic profile of the mobile application 313. The mobile application access component accesses 318 the mobile application 313 on the user device 312. The mobile application access component determines 319 the mode of operation of the mobile application 313. The mobile application 313 is either in the dormant mode of operation or the active mode of operation. Consider an example where the mobile application 313 is in the dormant mode of operation. The mobile application 313 in the dormant mode of operation transmits a control signal request to the 3G or 4G network 317 to request access of the mobile application 313 to the 3G or 4G network 317. The mobile application access component processes 320 the control signal request to access the 3G or 4G network 317, transmitted by the mobile application 313 in the dormant mode of operation. The mobile application access component accesses 321 the dormant control signal traffic profile parameter of the mobile application 313. The mobile application access component receives 324 the threshold limit for the dormant mode of operation of the mobile application 313 from the service entity 308. The mobile application access component normalizes 325 the received threshold limit for the dormant mode of operation with the accessed dormant control signal traffic profile parameter of the mobile application 313.

The mobile application access component compares 326 the accessed dormant control signal traffic profile parameter of the mobile application 313 with the normalized threshold limit for the dormant mode of operation of the mobile application 313. The mobile application access component, based on the comparison of the accessed dormant control signal traffic profile parameter of the mobile application 313 with the normalized threshold limit for the dormant mode of operation of the mobile application 313, determines 327 whether the dormant control signal traffic profile parameter of the mobile application 313 exceeds the normalized threshold limit for the dormant mode of operation of the mobile application 313. If the dormant control signal traffic profile parameter of the mobile application 313 does not exceed the normalized threshold limit for the dormant mode of operation of the mobile application 313, the mobile application access component grants 332 access of the mobile application 313 in the dormant mode of operation to the 3G or 4G network 317 as exemplarily illustrated in FIG. 3F. Hence, the mobile application 313 accesses 333 the 3G or 4G network 317 in the dormant mode of operation. If the dormant control signal traffic profile parameter of the mobile application 313 exceeds the normalized threshold limit for the dormant mode of operation of the mobile application 313, the mobile application access component terminates 334 access of the mobile application 313 in the dormant mode of operation to the 3G or 4G network 317 as exemplarily illustrated in FIG. 3F. In this embodiment, the mobile application access component transmits 335 a notification to the user device 312 to indicate the termination of the access to the 3G or 4G network 317.

Consider another example where the mobile application 313 is in the active mode of operation. The mobile application 313 in the active mode of operation transmits a control signal request to the 3G or 4G network 317 to request access of the mobile application 313 to the 3G or 4G network 317. The mobile application access component processes 322 the control signal request to access the 3G or 4G network 317, transmitted by the mobile application 313 in the active mode of operation. The mobile application access component accesses 323 the active control signal traffic profile parameter of the mobile application 313. The mobile application access component receives 328 the threshold limit for the active mode of operation of the mobile application 313 from the service entity 308. The mobile application access component normalizes 329 the received threshold limit for the active mode of operation with the accessed active control signal traffic profile parameter of the mobile application 313. The mobile application access component compares 330 the accessed active control signal traffic profile parameter of the mobile application 313 with the normalized threshold limit for the active mode of operation of the mobile application 313 as exemplarily illustrated in FIG. 3E.

The mobile application access component, based on the comparison of the accessed active control signal traffic profile parameter of the mobile application 313 with the normalized threshold limit for the active mode of operation of the mobile application 313, determines 331 whether the active control signal traffic profile parameter of the mobile application 313 exceeds the normalized threshold limit for the active mode of operation of the mobile application 313. If the active control signal traffic profile parameter of the mobile application 313 does not exceed the normalized threshold limit for the active mode of operation of the mobile application 313, the mobile application access component grants 336 access of the mobile application 313 in the active mode of operation to the 3G or 4G network 317 as exemplarily illustrated in FIG. 3F. Hence, the mobile application 313 in the active mode of operation accesses 337 the 3G or 4G network 317 in the active mode of operation. If the active control signal traffic profile parameter of the mobile application 313 exceeds the normalized threshold limit for the active mode of operation of the mobile application 313, the mobile application access component terminates 338 access of the mobile application 313 in the active mode of operation to the 3G or 4G network 317 as exemplarily illustrated in FIG. 3F. The mobile application access component then transmits 339 a notification to the user device 312 to indicate the termination of the access to the 3G or 4G network 317.

Figure 4:
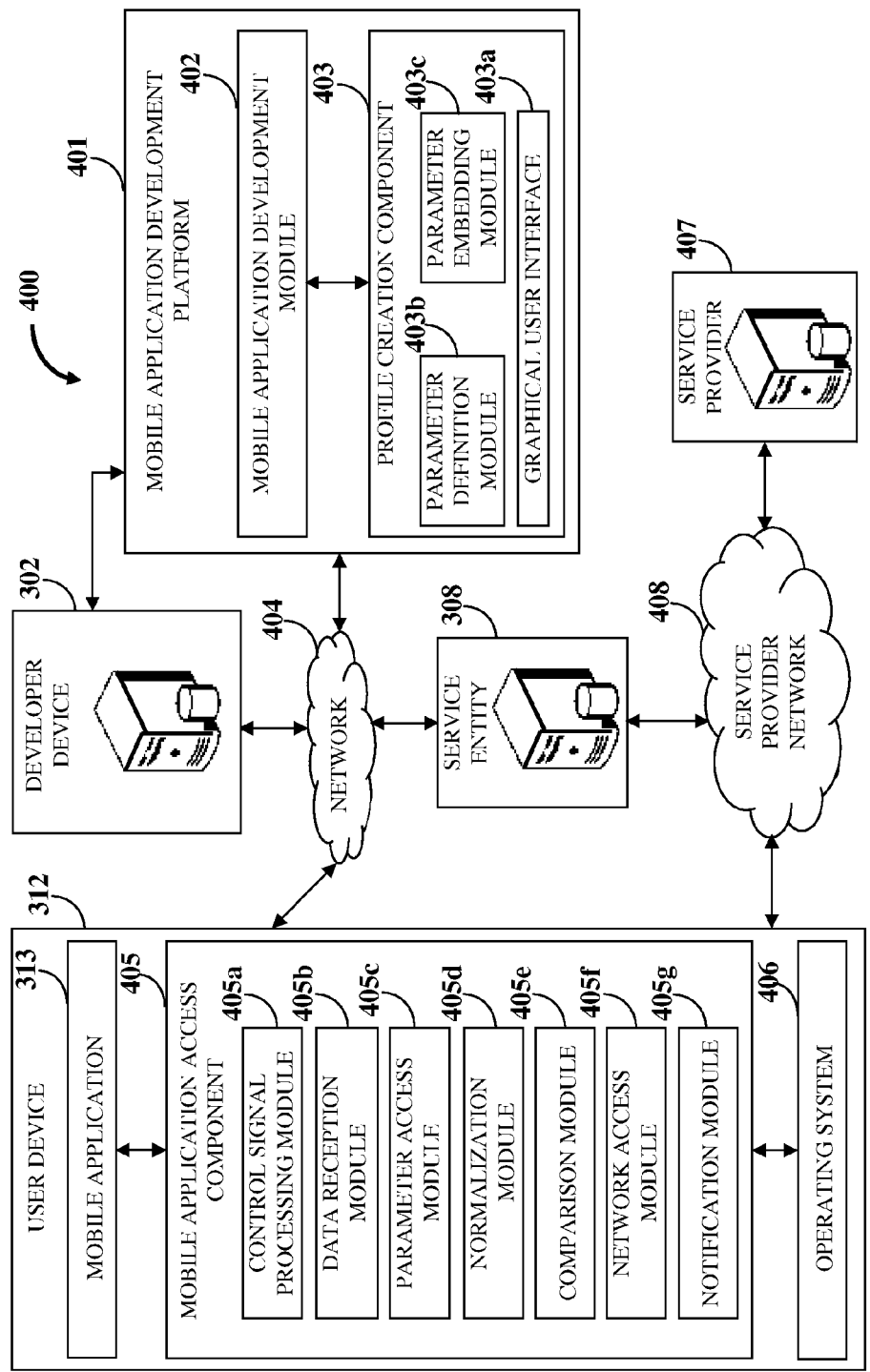
FIG. 4 exemplarily illustrates a computer implemented system for managing selective access of a mobile application to one of multiple networks based on the control signal traffic profile of the mobile application.

FIG. 4 exemplarily illustrates a computer implemented system 400 for managing selective access of a mobile application 313 to one of multiple networks, for example, a service provider network 408 based on the control signal traffic profile of the mobile application 313. The computer implemented system 400 disclosed herein comprises the profile creation component 403 deployed, for example, on a mobile application development platform 401 accessible by a developer device 302 and a user device 312 via a network 404, for example, the internet, a WiFi® network of the Wireless Ethernet Compatibility Alliance, Inc., a third generation (3G) mobile communication network, a fourth generation (4G) mobile communication network, a long term evolution (LTE) mobile communication network, etc. The developer device 302 accesses the mobile application development platform 401 directly or via the network 404. The user device 312 accesses the mobile application development platform 401 via the network 404. The user device 312 also communicates with a service provider 407 via the service provider network 408. The service provider 407 provides access of the mobile application 313 on the user device 312 to the service provider network 408, for example, the 3G mobile communication network, the 4G mobile communication network, the LTE mobile communication network, etc. The user device 312 also communicates with a service entity 308, for example, a device operating system vendor, a mobile device vendor, etc., via the network 404.

In an embodiment, the mobile application development platform 401 hosts a mobile application development module 402 and the profile creation component 403. The mobile application development platform 401 comprises at least one processor configured to execute modules, for example, 403a, 403b, 403c, etc., of the profile creation component 403 and the mobile application development module 402. The mobile application development platform 401 further comprises a non-transitory computer readable storage medium communicatively coupled to the processor of the mobile application development platform 401. The non-transitory computer readable storage medium stores the modules, for example, 403a, 403b, 403c, etc., of the profile creation component 403 and the mobile application development module 402. The mobile application development module 402 develops the mobile application 313 for deployment on the user device 312 based on entity inputs received, for example, from an application developer 301 exemplarily illustrated in FIG. 3A, via the developer device 302.

The profile creation component 403 executable by the processor of the mobile application development platform 401 creates the control signal traffic profile of the mobile application 313. The profile creation component 403 comprises a graphical user interface (GUI) 403a, a parameter definition module 403b, and a parameter embedding module 403c. The GUI 403a of the profile creation component 403 receives entity inputs for example, from the application developer 301 for the definition of the control signal traffic profile parameters for the different modes of operation of the mobile application 313. The parameter definition module 403b defines control signal traffic profile parameters, for example, an active control signal traffic profile parameter and a dormant control signal traffic profile parameter for the different modes of operation of the mobile application 313 based on the entity inputs. In an embodiment, the parameter definition module 403b categorizes the control signal traffic profile parameters for the different modes of operation of the mobile application 313 into classes as disclosed in the detailed description of FIG. 1. The parameter embedding module 403c embeds the defined control signal traffic profile parameters in the mobile application 313 for creating the control signal traffic profile for the mobile application 313. The mobile application 313 selectively accesses the service provider network 408 based on the created control signal traffic profile.

The computer implemented system 400 disclosed herein further comprises the mobile application access component 405 in operative communication with the mobile application 313 implemented in the user device 312. The mobile application access component 405 is executable by at least one processor of the user device 312. In an embodiment, the mobile application access component 405 is in operative communication with an operating system 406 of the user device 312. The processor is configured to execute modules, for example, 405a, 405b, 405c, 405d, 405e, 405f, 405g, etc., of the mobile application access component 405. The mobile application access component 405 further comprises a non-transitory computer readable storage medium communicatively coupled to the processor of the user device 312. The non-transitory computer readable storage medium stores the modules, for example, 405a, 405b, 405c, 405d, 405e, 405f, 405g, etc., of the mobile application access component 405. The mobile application access component 405 comprises a control signal processing module 405a, a data reception module 405b, a parameter access module 405c, a normalization module 405d, a comparison module 405e, a network access module 405f, and a notification module 405g. The control signal processing module 405a processes a control signal request to access the service provider network 408 transmitted by the mobile application 313 to the service provider 407. The data reception module 405b receives threshold limits for the different modes of operation of the mobile application 313 from the service entity 308, for example, a service provider 407, a device operating system vendor, a mobile device vendor, etc. The parameter access module 405c accesses the defined control signal traffic profile parameters embedded in the mobile application 313. In an embodiment, the normalization module 405d normalizes the received threshold limits for the different modes of operation of the mobile application 313 with the accessed control signal traffic profile parameters of the mobile application 313 in associated modes of operation. The comparison module 405e compares the accessed control signal traffic profile parameters with the normalized threshold limits for the associated modes of operation of the mobile application 313.

The network access module 405f manages the selective access of the mobile application 313 in the different modes of operation to the service provider network 408 based on the comparison of the accessed control signal traffic profile parameters with the normalized threshold limits for the associated modes of operation of the mobile application 313. The network access module 405f grants access of the mobile application 313 in the different modes of operation to the service provider network 408, if the accessed control signal traffic profile parameters of the mobile application 313 do not exceed the normalized threshold limits for the associated modes of operation of the mobile application 313. The network access module 405f terminates access of the mobile application 313 in the different modes of operation to the service provider network 408, if the accessed control signal traffic profile parameters of the mobile application 313 exceed the normalized threshold limits for the associated modes of operation of the mobile application 313. In another embodiment, the network access module 405f switches access of the mobile application 313 in the different modes of operation from the service provider network 408 to another service provider network, if the accessed control signal traffic profile parameters of the mobile application 313 exceed the normalized threshold limits for the associated modes of operation of the mobile application 313.

In an embodiment, the data reception module 405b of the mobile application access component 405 receives a total threshold limit for each of the different modes of operation of multiple mobile applications implemented in the user device 312 from the service entity 308, for example, a service provider 407, a device operating system vendor, a mobile device vendor, etc. In this embodiment, the parameter access module 405c of the mobile application access component 405 determines a sum of the control signal traffic profile parameters embedded in each of the mobile applications for each of the associated modes of operation. In this embodiment, the normalization module 405d of the mobile application access component 405 normalizes the received total threshold limit for each of the different modes of operation of the mobile applications with the determined sum of the control signal traffic profile parameters of the mobile applications in the associated modes of operation. In this embodiment, the comparison module 405e of the mobile application access component 405 compares the determined sum of the control signal traffic profile parameters for each of the associated modes of operation with the normalized total threshold limit for each of the associated modes of operation of the mobile applications.

The network access module 405f grants access of the mobile applications in the different modes of operation to the service provider network 408, if the determined sum of the control signal traffic profile parameters of the mobile applications for each of the associated modes of operation does not exceed the normalized total threshold limit for each of the associated modes of operation of the mobile applications. In an embodiment, the data reception module 405b further receives user inputs from the user device 312 to terminate access of one or more of the mobile applications in the different modes of operation to the service provider network 408, if the determined sum of the control signal traffic profile parameters of the mobile applications exceeds the normalized total threshold limit for each of the associated modes of operation of the mobile applications. In another embodiment, the data reception module 405b of the mobile application access component 405 further receives user inputs from the user device 312 to switch access of one or more of the mobile applications in the different modes of operation from one service provider network 408 to another service provider network, if the determined sum of the control signal traffic profile parameters of the mobile applications exceeds the normalized total threshold limit for each of the associated modes of operation of the mobile applications. The notification module 405g of the mobile application access component 405 generates and transmits notifications to the user device 312 for indicating actions associated with the management of the selective access of the mobile application 313 in the different modes of operation to the service provider network 408. In an embodiment, the notification module 405g of the mobile application access component 405 generates and transmits notifications to the mobile application 313 only for indicating termination of the access of the mobile application 313 to the service provider network 408.

Figure 5:
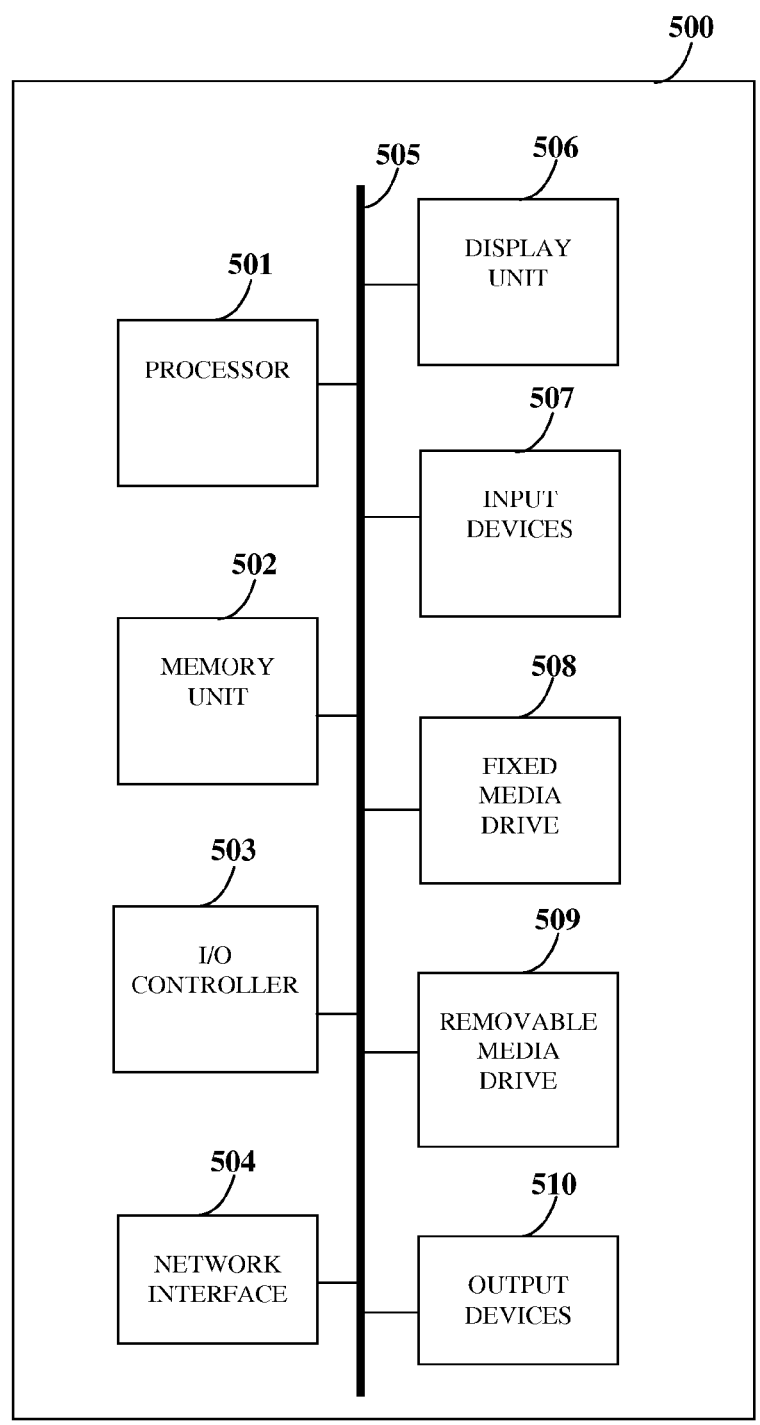
FIG. 5 exemplarily illustrates the architecture of a computer system employed by a profile creation component for creating a control signal traffic profile for a mobile application, and by a mobile application access component for managing selective access of the mobile application to one of the networks based on the control signal traffic profile of the mobile application.

FIG. 5 exemplarily illustrates the architecture of a computer system 500 employed by the profile creation component 403 exemplarily illustrated in FIG. 4, for creating a control signal traffic profile for a mobile application 313, and by the mobile application access component 405 exemplarily illustrated in FIG. 4 for managing selective access of the mobile application 313 to one of the networks, for example, 408, etc., exemplarily illustrated in FIG. 4, based on the control signal traffic profile of the mobile application 313. The profile creation component 403 and the mobile application access component 405 of the computer implemented system 400 exemplarily illustrated in FIG. 4 employ the architecture of the computer system 500 exemplarily illustrated in FIG. 5. The computer system 500 is programmable using a high level computer programming language. The computer system 500 may be implemented using programmed and purposeful hardware.

The mobile application development platform 401 hosting the mobile application development module 402 and the profile creation component 403 communicates with a developer device 302 exemplarily illustrated in FIG. 3A, via a network 404, for example, a short range network or a long range network. Similarly, the user device 312 communicates with a service provider 407 via a service provider network 408. The computer system 500 comprises, for example, a processor 501, a memory unit 502 for storing programs and data, an input/output (I/O) controller 503, a network interface 504, a data bus 505, a display unit 506, input devices 507, a fixed media drive 508, a removable media drive 509 for receiving removable media, output devices 510, etc.

The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 501 may also be implemented as a processor set comprising, for example, a general purpose microprocessor and a math or graphics co-processor. The processor 501 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The profile creation component 403 and the mobile application access component 405 disclosed herein are not limited to implementation on the computer system 500 employing the processor 501. The computer system 500 may also employ a controller or a microcontroller.

The memory unit 502 is used for storing programs, applications, and data. For example, the parameter definition module 403b and the parameter embedding module 403c of the profile creation component 403, and the mobile application development module 402 of the mobile application development platform 401, are stored in the memory unit 502 of the mobile application development platform 401. In another example, the control signal processing module 405a, the data reception module 405b, the parameter access module 405c, the normalization module 405d, the comparison module 405e, the network access module 405f, and the notification module 405g of the mobile application access component 405 are stored in the memory unit 502 of the user device 312. The memory unit 502 is, for example, a random access memory (RAM) or another type of dynamic storage device that stores information and instructions for execution by the processor 501. The memory unit 502 also stores temporary variables and other intermediate information used during execution of the instructions by the processor 501. The computer system 500 further comprises a read only memory (ROM) or another type of static storage device that stores static information and instructions for the processor 501.

The I/O controller 503 of the mobile application development platform 401 controls input actions and output actions performed by the profile creation component 403 and the mobile application development module 402 of the mobile application development platform 401. The I/O controller 503 of the user device 312 controls input actions and output actions performed by the mobile application access component 405. The network interface 504 enables connection of the computer system 500 to one of the networks, for example, 404, 408, etc. For example, the mobile application development platform 401 connects to the network 404 via the network interface 504 of the mobile application development platform 401. The mobile application access component 405 on the user device 312 connects to the service provider network 408 and/or the network 404 via the network interface 504 of the user device 312. In an embodiment, the network interface 504 is provided as an interface card also referred to as a line card. The network interface 504 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 505 of the mobile application development platform 401 permits communications between the modules, for example, 402, 403a, 403b, 403c, etc., of the mobile application development platform 401. The data bus 505 of the user device 312 permits communications between the modules, for example, 405a, 405b, 405c, 405d, 405e, 405f, 405g, etc., of the mobile application access component 405, and between the mobile application 313, the mobile application access component 405, and the operating system 406.

The display unit 506 displays information, display interfaces, interface elements such as text fields, checkboxes, drop down menus, text boxes, hyperlinks, etc., for allowing a user, for example, 301, 311, etc., exemplarily illustrated in FIG. 3A and FIG. 3C to enter inputs associated with the mobile application 313. The display unit 506 comprises, for example, a liquid crystal display, a plasma display, an organic light emitting diode (OLED) based display, etc. The input devices 507 are used for inputting data into the computer system 500. A user, for example, an application developer 301 exemplarily illustrated n FIG. 3A, who desires to develop a mobile application 313 and create a control signal traffic profile for the mobile application 313 uses one or more of the input devices 507 of the developer device 302 to provide inputs to the profile creation component 403 hosted on the mobile application development platform 401. For example, an application developer 301 may enter a program code to develop a mobile application 313, create a control signal traffic profile for the mobile application 313, embed the created control signal traffic profile in the mobile application 313, etc., using the input devices 507. The input devices 507 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 500. The programs are loaded onto the fixed media drive 508 and into the memory unit 502 of the computer system 500 via the removable media drive 509. In an embodiment, the computer applications and programs may be loaded directly via one of the networks, for example, 404, 408, etc. Computer applications and programs are executed by double clicking a related icon displayed on the display unit 506 using one of the input devices 507. The output devices 510 output the results of operations performed by the mobile application development module 402 and the profile creation component 403 of the mobile application development platform 401, and by the mobile application access component 405 of the user device 312. For example, the notification module 405g of the mobile application access component 405 displays notifications on a graphical user interface (GUI) of the user device 312 on actions associated with managing the selective access of the mobile application 313 implemented in the user device 312 to one of the networks, for example, 408, etc., using the output devices 510.

The processor 501 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., the Palm OS®, the Solaris operating system developed by Sun Microsystems, Inc., the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. The computer system 500 employs the operating system, for example, 406 for performing multiple tasks. The operating system is responsible for management and coordination of activities and sharing of resources of the computer system 500. The operating system further manages security of the computer system 500, peripheral devices connected to the computer system 500, and network connections. The operating system employed on the computer system 500 recognizes, for example, inputs provided by the user, for example, 301, 311, etc., using one of the input devices 507, the output display, files, and directories stored locally on the fixed media drive 508, for example, a hard drive. The operating system on the computer system 500 executes different programs using the processor 501. The processor 501 and the operating system together define a computer platform for which application programs in high level programming languages are written.

The processor 501 retrieves instructions for executing the modules, for example, 402, 403a, 403b, 403c, etc., of the mobile application development platform 401, and 405a, 405b, 405c, 405d, 405e, 405f, 405g, etc., of the mobile application access component 405 from the memory unit 502. A program counter determines the location of the instructions in the memory unit 502. The program counter stores a number that identifies the current position in the program of each of the modules, for example, 402, 403a, 403b, 403c, etc., of the mobile application development platform 401, and 405a, 405b, 405c, 405d, 405e, 405f, 405g, etc., of the mobile application access component 405. The instructions fetched by the processor 501 from the memory unit 502 after being processed are decoded. The instructions are stored in an instruction register in the processor 501. After processing and decoding, the processor 501 executes the instructions. For example, the mobile application development module 402 defines instructions for developing the mobile application 313 for the user device 312. The parameter definition module 403b of the profile creation component 403 defines instructions for defining control signal traffic profile parameters, for example, the active control signal traffic profile parameter, the dormant control signal traffic profile parameter, etc., for different modes of operation of the mobile application 313. In an embodiment, the parameter definition module 403b defines instructions for categorizing the control signal traffic profile parameters for the different modes of operation of the mobile application 313 into classes. The parameter embedding module 403c of the profile creation component 403 defines instructions for embedding the defined control signal traffic profile parameters in the mobile application 313 for creating the control signal traffic profile for the mobile application 313.

The control signal processing module 405a of the mobile application access component 405 defines instructions for processing a control signal request to access the service provider network 408 transmitted by the mobile application 313 to the service provider 407. The data reception module 405b of the mobile application access component 405 defines instructions for receiving threshold limits for the different modes of operation of the mobile application 313 from a service entity 308. The parameter access module 405c of the mobile application access component 405 defines instructions for accessing the defined control signal traffic profile parameters embedded in the mobile application 313. The normalization module 405d of the mobile application access component 405 defines instructions for normalizing the received threshold limits for the different modes of operation of the mobile application 313 with the accessed control signal traffic profile parameters of the mobile application 313 in associated modes of operation. The comparison module 405e of the mobile application access component 405 defines instructions for comparing the accessed control signal traffic profile parameters with the normalized threshold limits for the associated modes of operation of the mobile application 313.

The network access module 405f of the mobile application access component 405 defines instructions for managing the selective access of the mobile application 313 in the different modes of operation to the service provider network 408 based on the comparison of the accessed control signal traffic profile parameters with the normalized threshold limits for the associated modes of operation of the mobile application 313. Furthermore, the network access module 405f defines instructions for granting access of the mobile application 313 in the different modes of operation to the service provider network 408, if the accessed control signal traffic profile parameters of the mobile application 313 do not exceed the normalized threshold limits for the associated modes of operation of the mobile application 313. Furthermore, the network access module 405f defines instructions for terminating access of the mobile application 313 in the different modes of operation to the service provider network 408, if the accessed control signal traffic profile parameters of the mobile application 313 exceed the normalized threshold limits for the associated modes of operation of the mobile application 313. Furthermore, the network access module 405f defines instructions for switching access of the mobile application 313 in the different modes of operation from one network, for example, 408, etc., to another network, if the accessed control signal traffic profile parameters of the mobile application 313 exceed the normalized threshold limits for the associated modes of operation of the mobile application 313.

In an embodiment, the data reception module 405b also defines instructions for receiving a total threshold limit for each of the different modes of operation of multiple mobile applications implemented in the user device 312 from the service entity 308. Furthermore, the parameter access module 405c defines instructions for determining a sum of the control signal traffic profile parameters embedded in each of the mobile applications for each of the associated modes of operation. Furthermore, the normalization module 405d defines instructions for normalizing the received total threshold limit for each of the different modes of operation of the mobile applications with the determined sum of the control signal traffic profile parameters of the mobile applications in the associated modes of operation. Furthermore, the comparison module 405e defines instructions for comparing the determined sum of the control signal traffic profile parameters for each of the associated modes of operation with the normalized total threshold limit for each of the associated modes of operation of the mobile applications.

In this embodiment, the network access module 405f of the mobile application access component 405 further defines instructions for granting access of the mobile applications in the different modes of operation to the service provider network 408, if the determined sum of the control signal traffic profile parameters of the mobile applications for each of the associated modes of operation does not exceed the normalized total threshold limit for each of the associated modes of operation of the mobile applications. Furthermore, the data reception module 405b of the mobile application access component 405 defines instructions for receiving user inputs from the user 311 using the user device 312 to terminate access of one or more of the mobile applications in the different modes of operation to the service provider network 408, if the determined sum of the control signal traffic profile parameters of the mobile applications exceeds the normalized total threshold limit for each of the associated modes of operation of the mobile applications. Furthermore, the data reception module 405b of the mobile application access component 405 defines instructions for receiving user inputs from the user device 312 to switch the access of one or more of the mobile applications in the different modes of operation from one network, for example, 408, etc., to another network, if the determined sum of the control signal traffic profile parameters of the mobile applications exceeds the normalized total threshold limit for each of the associated modes of operation of the mobile applications. The notification module 405g of the mobile application access component 405 defines instructions for generating and transmitting notifications to the user device 312, indicating actions associated with the management of the selective access to the service provider network 408 provided to the mobile application 313 in different modes of operation. In an embodiment, the notification module 405g of the mobile application access component 405 defines instructions for generating and transmitting notifications to the user device 312 only for indicating termination of the access of the mobile application 313 to the service provider network 408.

The processor 501 of the computer system 500 employed by the mobile application development platform 401 retrieves the instructions defined by the parameter definition module 403b and the parameter embedding module 403c of the profile creation component 403, and the mobile application development module 402, and executes the instructions, thereby performing one or more processes defined by those instructions. Furthermore, the processor 501 of the computer system 500 employed by the user device 312 retrieves the instructions defined by the control signal processing module 405a, the data reception module 405b, the parameter access module 405c, the normalization module 405d, the comparison module 405e, the network access module 405f, and the notification module 405g of the mobile application access component 405, and executes the instructions, thereby performing one or more processes defined by those instructions.

At the time of execution, the instructions stored in the instruction register are examined to determine the operations to be performed. The processor 501 then performs the specified operations. The operations comprise arithmetic operations and logic operations. The operating system performs multiple routines for performing a number of tasks required to assign the input devices 507, the output devices 510, and memory for execution of the modules, for example, 402, 403a, 403b, 403c, etc., of the mobile application development platform 401, and the modules, for example, 405a, 405b, 405c, 405d, 405e, 405f, 405g, etc., of the mobile application access component 405. The tasks performed by the operating system comprise, for example, assigning memory to the modules, for example, 402, 403a, 403b, 403c, etc., of the mobile application development platform 401, and the modules, for example, 405a, 405b, 405c, 405d, 405e, 405f, 405g, etc., of the mobile application access component 405, and to data used by the mobile application development platform 401 and the user device 312, moving data between the memory unit 502 and disk units, and handling input/output operations. The operating system performs the tasks on request by the operations and after performing the tasks, the operating system transfers the execution control back to the processor 501. The processor 501 continues the execution to obtain one or more outputs. The outputs of the execution of the modules, for example, 402, 403a, 403b, 403c, etc., of the mobile application development platform 401 are displayed on the display unit 506 to the developer device 302, while the outputs of the execution of the modules, for example, 405a, 405b, 405c, 405d, 405e, 405f, 405g, etc., of the mobile application access component 405 are displayed on the display unit 506 to the user device 312.

For purposes of illustration, the detailed description refers to the profile creation component 403 and the mobile application access component 405, each being run locally on a computer system 500; however the scope of the computer implemented method and system 400 disclosed herein is not limited to the profile creation component 403 and the mobile application access component 405 each being run locally on the computer system 500 via the operating system and the processor 501, but may be extended to run remotely over the networks, for example, 404, 408, etc., by employing a web browser and a remote server, a mobile phone, or other electronic devices. One or more portions of the computer system 500 may be distributed across one or more computer systems (not shown) coupled to the networks, for example, 404, 408, etc.

Disclosed herein is also a computer program product comprising a non-transitory computer readable storage medium that stores computer program codes comprising instructions executable by at least one processor 501 for managing selective access of the mobile application 313 to one of the networks, for example, 408, based on the control signal traffic profile of the mobile application 313. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 501, except for a transitory, propagating signal.

The computer program product disclosed herein comprises a first computer program code for processing a control signal request to access one of the networks, for example, 408, transmitted by the mobile application 313 to the service provider 407; a second computer program code for receiving threshold limits for different modes of operation of the mobile application 313 from a service entity 308; a third computer program code for accessing control signal traffic profile parameters embedded in the mobile application 313, a fourth computer program code for normalizing the received threshold limits for the different modes of operation of the mobile application 313 with the accessed control signal traffic profile parameters of the mobile application 313 in associated modes of operation; a fifth computer program code for comparing the accessed control signal traffic profile parameters with the normalized threshold limits for the associated modes of operation of the mobile application 313; and a sixth computer program code for managing the selective access of the mobile application 313 in the different modes of operation to one of the networks, for example, 408, etc., based on the comparison of the accessed control signal traffic profile parameters with the normalized threshold limits for the associated modes of operation of the mobile application 313 as disclosed in the detailed description of FIG. 2.

The computer program product disclosed herein further comprises one or more additional computer program codes for performing additional steps that may be required and contemplated for managing selective access of the mobile application 313 to one of the networks, for example, 408, etc., based on the control signal traffic profile of the mobile application 313. In an embodiment, a single piece of computer program code comprising computer executable instructions performs one or more steps of the computer implemented method disclosed herein for managing the selective access of the mobile application 313 to one of the networks, for example, 408, etc., based on the control signal traffic profile of the mobile application 313.

The computer program codes comprising computer executable instructions are embodied on the non-transitory computer readable storage medium. The processor 501 of the computer system 500 retrieves these computer executable instructions and executes them. When the computer executable instructions are executed by the processor 501, the computer executable instructions cause the processor 501 to perform the steps of the computer implemented method for managing the selective access of the mobile application 313 to one of the networks, for example, 408, etc., based on the control signal traffic profile of the mobile application 313.

Consider an example where an application developer 301 exemplarily illustrated in FIG. 3A wishes to create a control signal traffic profile for a mobile application 313 exemplarily illustrated in FIG. 3C and FIG. 4. The control signal traffic profile of the mobile application 313 is configured to control signaling traffic caused by the mobile application 313 on a service provider network 408 exemplarily illustrated in FIG. 4, for example, a third generation (3G) mobile communication network or a fourth generation (4G) mobile communication network 317, a long term evolution (LTE) mobile communication network, etc. The mobile application 313 transmits control signal requests to a service entity 308, for example, a mobile application vendor exemplarily illustrated in FIG. 3B and FIG. 4, to access updates of the mobile application 313 from a central database managed by the service entity 308. The application developer 301 tests and/or estimates control signal traffic data of the mobile application 313, for example, a number of the control signal requests that the mobile application 313 transmits per unit time, for example, per hour, to the mobile application vendor via one of the networks, for example, 315, 317, etc., exemplarily illustrated in FIG. 3C, in different modes of operation of the mobile application 313. In this example, the different modes of operation of the mobile application 313 are an active mode of operation and a dormant mode of operation. The mobile application 313 transmits, for example, 300 control signal requests per hour in the active mode of operation and 100 control signal requests per hour in the dormant mode of operation. These values of the control signal traffic data of the mobile application 313 in the different modes of operation are called control signal traffic profile parameters. The application developer 301 defines and embeds these control signal traffic profile parameters in the mobile application 313 for creating the control signal traffic profile of the mobile application 313. Once the mobile application's 313 control signal traffic profile is created, the mobile application vendor releases the mobile application 313 via one of the networks, for example, 315, 317, etc.

A user 311 exemplarily illustrated in FIG. 3C can download and/or purchase the mobile application 313 from the mobile application vendor on his/her user device 312 exemplarily illustrated in FIG. 3C and FIG. 4, for example, a smart phone, a personal digital assistant (PDA), etc., via one of the networks, for example, 315, 317, etc. For example, a user 311, Michael, downloads the mobile application 313 on his user device 312. Michael attempts to access the 3G or 4G network 317 and actively use the mobile application 313, thus using the mobile application 313 in the active mode of operation. The 3G or 4G network 317 is provided by a service provider 407 exemplarily illustrated in FIG. 4, for example, American Telephone and Telegraph Company (AT&T). In order to receive the latest updates of the mobile application 313 from the central database, the mobile application 313 transmits control signal requests to a service provider network 408, for example, the 3G or 4G network 317.

The mobile application access component 405 deployed on an operating system 406 exemplarily illustrated in FIG. 4, for example, iOS® of Apple Inc., the Android operating system, etc., of Michael's user device 312 processes the control signal requests transmitted to the 3G or 4G network 317. The service provider 407 of the 3G or 4G network 317 attempts to limit the number of control signal requests transmitted by multiple user devices 312 to the 3G or 4G network 317 to prevent network outages due to control signal traffic storms by terminating access of the mobile applications that send a large number of control signal requests to the 3G or 4G network 317. The service provider 407 therefore determines a threshold limit for each of the mobile applications in different modes of operation. In this example, the service provider 407 determines the threshold limit for the active mode of operation of the mobile application 313 as 4 control signal requests per minute. The mobile application access component 405 receives the threshold limit for the active mode of operation of the mobile application 313 from the service provider 407. The mobile application access component 405 normalizes the threshold limit received from the service provider 407 with the active control signal traffic profile parameter as the unit of the active control signal traffic profile parameter of the mobile application 313 is in hours and the unit of the threshold limit for the active mode of operation of the mobile application 313 is in minutes. Hence, the mobile application access component 405 normalizes the received threshold limit to 240 control signal requests per hour. The mobile application access component 405 compares the active control signal traffic profile parameter of the mobile application 313 with the normalized threshold limit for the active mode of operation of the mobile application 313. Since the active control signal traffic profile parameter exceeds the normalized threshold limit, the mobile application access component 405 terminates access of the mobile application 313 to transmit control signal requests to the 3G or 4G network 317. The mobile application 313 is considered as a rogue mobile application as the active control signal traffic profile parameter embedded in the mobile application 313 exceeds the normalized threshold limit for the active mode of operation of the mobile application 313. Hence, the mobile application access component 405 successfully prevents congestion at the 3G or 4G network 317 by terminating access of the rogue mobile application to the 3G or 4G network 317.

If the active control signal traffic profile parameter of the mobile application 313 is less than the normalized threshold limit for the active mode of operation of the mobile application 313, the mobile application access component 405 grants access of the mobile application 313 to the 3G or 4G network 317. In this case, the mobile application 313 is considered as a docile mobile application because the active control signal traffic profile parameter of the mobile application 313 does not exceed the normalized threshold limit for the active mode of operation of the mobile application 313. Hence, the mobile application access component 405 identifies whether the mobile application 313 is a rogue mobile application or a docile mobile application and prevents rogue applications from overloading the 3G or 4G network 317 and draining the battery life of the user device 312.

Consider another example where an application developer 301 exemplarily illustrated in FIG. 3A, defines the control signal traffic profile parameters for a mobile application 313 exemplarily illustrated in FIG. 3C and FIG. 4 in different modes of operation by categorizing the control signal traffic profile parameters into classes. The mobile application 313 transmits control signal requests to the 3G or 4G network 317 exemplarily illustrated in FIG. 3C, to access updates of the mobile application 313 from a central database managed by a service entity 308 exemplarily illustrated in FIG. 3B and FIG. 4, for example, a mobile application vendor. The application developer 301 analyzes the number of control signal requests transmitted by the mobile application 313 per hour in the active mode of operation and in the dormant mode of operation. The mobile application 313 transmits, for example, 300 control signal requests per hour in the active mode of operation and 100 control signal requests per hour in the dormant mode of operation. The application developer 301 embeds these control signal traffic profile parameters in the mobile application 313. The application developer 301 releases the mobile application 313 for users to download and/or purchase the mobile application 313 from the mobile application vendor.

A user 311 downloads the mobile application 313 on a user device 312 exemplarily illustrated in FIG. 3C, for example, a smart phone, via the 3G or 4G network 317. The user 311 using the user device 312 communicates with the 3G or 4G network 317 provided by a service provider 407 exemplarily illustrated in FIG. 4, for example, American Telephone and Telegraph Company (AT&T). The user 311 actively accesses the mobile application 313 via the 3G or 4G network 317. In order to access the latest updates of the mobile application 313, the mobile application 313 transmits a control signal request to the service provider 407 of the 3G or 4G network 317. In accordance with data usage policies formulated by the service provider 407, mobile applications that transmit less than 100 control signal requests per hour in the active mode of operation are classified as low control signal traffic data mobile applications. Mobile applications that transmit 100 to 500 control signal requests per hour in the active mode of operation are classified as medium control signal traffic data mobile applications. Furthermore, mobile applications that transmit more than 500 control signal requests per hour in the active mode of operation are classified as high control signal traffic data mobile applications.

The service provider 407 allows only medium control signal traffic data mobile applications and low control signal traffic data mobile applications to access the 3G or 4G network 317. In this example, the mobile application 313 is classified as the medium control signal traffic data mobile application as the mobile application 313 transmits 300 control signal requests per hour in the active mode of operation. The mobile application access component 405 deployed on an operating system 406 of the user device 312 exemplarily illustrated in FIG. 4, for example, the iOS® of Apple Inc., the Android operating system, etc., processes the control signal requests transmitted to the 3G or 4G network 317. The mobile application access component 405 accesses a control signal traffic data classification policy of the mobile application 313 in the active mode of operation provided by the service provider 407. Since the service provider 407 allows medium control signal traffic data mobile applications to access the 3G or 4G network 317, the mobile application access component 405 grants access of the mobile application 313 to the 3G or 4G network 317.

Consider another example where a user 311 exemplarily illustrated in FIG. 3C is not accessing any mobile application 313 on a user device 312 exemplarily illustrated in FIG. 3C and FIG. 4, and hence each mobile application 313 is in a dormant mode of operation. Each mobile application 313 is embedded with the dormant control signal traffic profile parameter. Although the user 311 is not actively accessing the mobile application 313 on the user device 312, one mobile application 313, for example, an email application transmits, for example, 3 control signal requests per minute to a network 408, for example, the 3G or 4G network 317 exemplarily illustrated in FIG. 3C, to access updates of the mobile application 313. The dormant control signal traffic profile parameter of that mobile application 313 is therefore 3 control signal requests per minute. The mobile application access component 405 exemplarily illustrated in FIG. 4 receives the threshold limit, for example, 2 control signal requests per minute, for the dormant mode of operation of the mobile application 313 from a service entity 308 exemplarily illustrated in FIG. 3B and FIG. 4. In this example, the mobile application access component 405 does not normalize the threshold limit for the dormant mode of operation of the mobile application 313 with the dormant control signal traffic profile parameter of the mobile application 313 as the system of units of each of the threshold limit for the dormant mode of operation of the mobile application 313 and the dormant control signal traffic profile parameter of the mobile application 313 is the same. The mobile application access component 405 compares the dormant control signal traffic profile parameter of the mobile application 313 with the received threshold limit for the dormant mode of operation of the mobile application 313. The dormant control signal traffic profile parameter of the mobile application 313 exceeds the received threshold limit for the dormant mode of operation of the mobile application 313. Since the dormant control signal traffic profile parameter of the mobile application 313 exceeds the threshold limit, the mobile application access component 405 terminates the access of the mobile application 313 in the dormant mode of operation to the 3G or 4G network 317, and sends a notification to the mobile application 313 of the user device 312. In an embodiment, the mobile application access component 405 prompts the user 311 to switch the access of the mobile application 313 in the dormant mode of operation from the 3G or 4G network 317 to the Wi-Fi® network 315 exemplarily illustrated in FIG. 3C.

Consider another example where a user 311 is actively accessing multiple mobile applications on the user device 312 exemplarily illustrated in FIG. 3C and FIG. 4, simultaneously. The mobile application access component 405 exemplarily illustrated in FIG. 4 determines a sum of the control signal requests transmitted by the mobile applications to the service provider 407 exemplarily illustrated in FIG. 4. The sum of the control signal requests transmitted by the mobile applications is, for example, 500 control signal requests per hour. This sum of the control signal requests transmitted by the mobile applications is the total active control signal traffic profile parameter of the mobile applications. The mobile application access component 405 receives a total threshold limit for all the mobile applications in the active mode of operation from a service entity 308. The total threshold limit for all the mobile applications in the active mode of operation is, for example, 400 control signal requests per hour. Since the total threshold limit for all the mobile applications in the active mode of operation is in the same system of units as the total active control signal traffic profile parameter of the mobile applications, the mobile application access component 405 does not perform normalization.

The mobile application access component 405 compares the total active control signal traffic profile parameter of the mobile applications with the total threshold limit for the mobile applications in the active mode of operation. Since the total active control signal traffic profile parameter of the mobile applications exceeds the total threshold limit of the mobile applications, the mobile application access component 405 generates and displays a notification comprising a list of the mobile applications of the user device 312 in the active mode of operation on the GUI of the user device 312. In an embodiment, the mobile application access component 405 transmits the generated notification to the user device 312, for example, via electronic mail (email), a short message service (SMS) message, a multimedia messaging service (MMS) message, etc. In an embodiment, the user 311 can customize notification settings of the user device 312 for reception of the notification from the mobile application access component 405, for example, by changing alarm settings, changing a mode of a notification, etc. The user 311 can then select one or more of the mobile applications from the list to terminate the access of the selected mobile applications to the 3G or 4G network 317 exemplarily illustrated in FIG. 3C via the user device 312. In an embodiment, the user 311 can switch the access of the selected mobile applications from the 3G or 4G network 317 to the Wi-Fi® network 315 exemplarily illustrated in FIG. 3C.

Consider another example where the user 311 wishes to change the access of the mobile application 313 exemplarily illustrated in FIG. 3C and FIG. 4 from the 3G or 4G network 317 exemplarily illustrated in FIG. 3C to the Wi-Fi® network 315 exemplarily illustrated in FIG. 3C. Consider an example where the user 311 is engaged in a voice over internet protocol (VoIP) call via the 3G or 4G network 317. When the user 311 enters an area, for example, a Wi-Fi® hotspot providing Wi-Fi® connectivity, the user 311 wishes to move the VoIP call from the 3G or 4G network 317 to the Wi-Fi® network 315 to obtain better or more economical connectivity, speed, quality of service, etc. The mobile application access component 405 on the user device 312 exemplarily illustrated in FIG. 3C and FIG. 4, transmits a notification to the user device 312 on detecting an available Wi-Fi® network 315. The user 311 selects the desired Wi-Fi® hotspot from the received notification. On receiving user inputs from the user device 312, the mobile application access component 405 grants access of the mobile application 313 to the Wi-Fi® network 315. The user 311 is now able to continue with the VoIP call via the Wi-Fi® network 315. In this example, the mobile application access component 405 does not compare the active control signal traffic profile parameter of the mobile application 313 with the threshold limit for the active mode of operation of the mobile application 313 received from the service provider 407 exemplarily illustrated in FIG. 4.

It will be readily apparent that the various methods, algorithms, and computer programs disclosed herein may be implemented on computer readable media appropriately programmed for general purpose computers, computing device, and wearable device. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Pascal, Perl®, Python®, Visual Basic®, etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

The present invention can be configured to work in a network environment comprising one or more computers that are in communication with one or more device via a network. The computers may communicate with the device directly or indirectly, via a wired medium or a wireless medium such as the Internet, a local area network (LAN), a wide area network (WAN) or the Ethernet, a token ring, or via any appropriate communications mediums or combination of communications mediums. Each of the device may comprise processors, for example, the Intel® processors, Advanced Micro Device (AMD®) processors, UltraSPARC® processors, hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the device executes an operating system, for example, the Linux® operating system, the Unix® operating system, any version of the Microsoft® Windows® operating system, the Mac OS of Apple Inc., the IBM® OS/2, the Palm OS®, the Android® OS, the Blackberry® OS, the Solaris operating system developed by Sun Microsystems, Inc., or any other operating system. Handheld device execute operating systems, for example, the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for creating a control signal traffic profile for a mobile application for managing selective access of said mobile application to one of a plurality of networks, comprising:
   providing a profile creation component executable by at least one processor configured to create said control signal traffic profile for said mobile application;
   defining control signal traffic profile parameters for different modes of operation of said mobile application by said profile creation component; and
   embedding said defined control signal traffic profile parameters in said mobile application for creating said control signal traffic profile for said mobile application, wherein said mobile application is configured to selectively access said one of said networks based on said created control signal traffic profile.

2. The computer implemented method of claim 1, wherein said control signal traffic profile parameters are configured to store control signal traffic data of said mobile application in said different modes of operation of said mobile application.

3. The computer implemented method of claim 1, wherein said definition of said control signal traffic profile parameters for said different modes of operation of said mobile application by said profile creation component comprises:
   defining an active control signal traffic profile parameter for said mobile application in an active mode of operation of said mobile application; and
   defining a dormant control signal traffic profile parameter for said mobile application in a dormant mode of operation of said mobile application.

4. The computer implemented method of claim 3, wherein said active control signal traffic profile parameter is configured to store an aggregated value of said control signal traffic data per unit time for said mobile application in said active mode of operation.

5. The computer implemented method of claim 3, wherein said dormant control signal traffic profile parameter is configured to store an aggregated value of said control signal traffic data per unit time for said mobile application in said dormant mode of operation.

6. The computer implemented method of claim 1, wherein said definition of said control signal traffic profile parameters for said different modes of operation of said mobile application by said profile creation component comprises categorizing said control signal traffic profile parameters into classes.

7. The computer implemented method of claim 1, further comprising receiving entity inputs from a service entity by said profile creation component for said definition of said control signal traffic profile parameters for said different modes of operation of said mobile application.

8. A computer implemented method for managing selective access of a mobile application to one of a plurality of networks based on a control signal traffic profile of said mobile application, comprising:
   providing a mobile application access component executable by at least one processor configured to manage said selective access of said mobile application to said one of said networks;
   processing a control signal request to access said one of said networks transmitted by said mobile application to a service provider, by said mobile application access component;
   receiving threshold limits for different modes of operation of said mobile application by said mobile application access component from a service entity;
   accessing control signal traffic profile parameters embedded in said mobile application by said mobile application access component, said control signal traffic profile parameters defining said control signal traffic profile of said mobile application;
   comparing said accessed control signal traffic profile parameters with said received threshold limits for associated said different modes of operation of said mobile application by said mobile application access component; and
   managing said selective access of said mobile application in said different modes of operation to said one of said networks by said mobile application access component based on said comparison of said accessed control signal traffic profile parameters with said received threshold limits for said associated said different modes of operation of said mobile application.

9. The computer implemented method of claim 8, further comprising normalizing said received threshold limits for said different modes of operation of said mobile application with said accessed control signal traffic profile parameters of said mobile application in said associated said different modes of operation by said mobile application access component.

10. The computer implemented method of claim 8, wherein said management of said selective access of said mobile application in said different modes of operation to said one of said networks by said mobile application access component comprises granting access of said mobile application in said different modes of operation to said one of said networks, if said accessed control signal traffic profile parameters of said mobile application do not exceed said received threshold limits for said associated said different modes of operation of said mobile application.

11. The computer implemented method of claim 8, wherein said management of said selective access of said mobile application in said different modes of operation to said one of said networks by said mobile application access component comprises terminating access of said mobile application in said different modes of operation to said one of said networks, if said accessed control signal traffic profile parameters of said mobile application exceed said received threshold limits for said associated said different modes of operation of said mobile application.

12. The computer implemented method of claim 8, wherein said management of said selective access of said mobile application in said different modes of operation to said one of said networks by said mobile application access component comprises switching access of said mobile application in said different modes of operation from said one of said networks to another of said networks, if said accessed control signal traffic profile parameters of said mobile application exceed said received threshold limits for said associated said different modes of operation of said mobile application.

13. The computer implemented method of claim 8, further comprising:
   receiving a total threshold limit for each of said different modes of operation of a plurality of mobile applications implemented in a user device by said mobile application access component from said service entity;
   determining a sum of said control signal traffic profile parameters embedded in said mobile applications for each of associated said different modes of operation by said mobile application access component; and
   comparing said determined sum of said control signal traffic profile parameters for said each of said associated said different modes of operation with said received total threshold limit for said each of said associated said different modes of operation of said mobile applications by said mobile application access component.

14. The computer implemented method of claim 13, further comprising normalizing said received total threshold limit for said each of said different modes of operation of said mobile applications with said determined sum of said control signal traffic profile parameters of said mobile applications in said associated said different modes of operation by said mobile application access component.

15. The computer implemented method of claim 13, further comprising granting access of said mobile applications in said different modes of operation to said one of said networks by said mobile application access component, if said determined sum of said control signal traffic profile parameters of said mobile applications for said each of said associated said different modes of operation does not exceed said received total threshold limit for said each of said associated said different modes of operation of said mobile applications.

16. The computer implemented method of claim 13, further comprising receiving user inputs from said user device by said mobile application access component to terminate access of one or more of said mobile applications in said different modes of operation to said one of said networks, if said determined sum of said control signal traffic profile parameters of said mobile applications exceeds said received total threshold limit for said each of said associated said different modes of operation of said mobile applications.

17. The computer implemented method of claim 13, further comprising receiving user inputs from said user device by said mobile application access component to switch access of said one or more of said mobile applications in said different modes of operation from said one of said networks to another of said networks, if said determined sum of said control signal traffic profile parameters of said mobile applications exceeds said received total threshold limit for said each of said associated said different modes of operation of said mobile applications.

18. The computer implemented method of claim 8, further comprising generating and transmitting notifications to a user device for indicating actions associated with said management of said selective access of said mobile application in said different modes of operation to said one of said networks by said mobile application access component.

19. A computer implemented system for managing selective access of a mobile application to one of a plurality of networks based on a control signal traffic profile of said mobile application, comprising:
   at least one first processor;
   a first non-transitory computer readable storage medium communicatively coupled to said at least one first processor, said first non-transitory computer readable storage medium configured to store a profile creation component;
   said profile creation component executable by said at least one first processor, said profile creation component comprising:
      a parameter definition module configured to define control signal traffic profile parameters for different modes of operation of said mobile application; and
      a parameter embedding module configured to embed said defined control signal traffic profile parameters in said mobile application for creating said control signal traffic profile for said mobile application, wherein said mobile application is configured to selectively access said one of said networks based on said created control signal traffic profile;
   at least one second processor;
   a second non-transitory computer readable storage medium communicatively coupled to said at least one second processor, said second non-transitory computer readable storage medium configured to store a mobile application access component; and
   said mobile application access component in operative communication with said mobile application implemented in a user device and executable by said at least one second processor, said mobile application access component comprising:
      a control signal processing module configured to process a control signal request to access said one of said networks transmitted by said mobile application to a service provider;
      a data reception module configured to receive threshold limits for said different modes of operation of said mobile application from a service entity;
      a parameter access module configured to access said defined control signal traffic profile parameters embedded in said mobile application;

a comparison module configured to compare said accessed control signal traffic profile parameters with said received threshold limits for associated said different modes of operation of said mobile application; and a network access module configured to manage said selective access of said mobile application in said different modes of operation to said one of said networks based on said comparison of said accessed control signal traffic profile parameters with said received threshold limits for said associated said different modes of operation of said mobile application.

20. The computer implemented system of claim 19, wherein said control signal traffic profile parameters are configured to store control signal traffic data of said mobile application in said different modes of operation of said mobile application.

21. The computer implemented system of claim 19, wherein said control signal traffic profile parameters for said different modes of operation of said mobile application defined by said parameter definition module of said profile creation component comprise:

an active control signal traffic profile parameter for said mobile application in an active mode of operation of said mobile application; and a dormant control signal traffic profile parameter for said mobile application in a dormant mode of operation of said mobile application.

22. The computer implemented system of claim 21, wherein said active control signal traffic profile parameter is configured to store an aggregated value of said control signal traffic data per unit time for said mobile application in said active mode of operation, and wherein said dormant control signal traffic profile parameter is configured to store an aggregated value of said control signal traffic data per unit time for said mobile application in said dormant mode of operation.

23. The computer implemented system of claim 19, wherein said parameter definition module of said profile creation component is further configured to categorize said control signal traffic profile parameters for said different modes of operation of said mobile application into classes.

24. The computer implemented system of claim 19, wherein said profile creation component further comprises a graphical user interface configured to receive entity inputs from said service entity for said definition of said control signal traffic profile parameters for said different modes of operation of said mobile application.

25. The computer implemented system of claim 19, wherein said mobile application access component further comprises a normalization module configured to normalize said received threshold limits for said different modes of operation of said mobile application with said accessed control signal traffic profile parameters of said mobile application in said associated said different modes of operation.

26. The computer implemented system of claim 19, wherein said network access module of said mobile application access component is configured to grant access of said mobile application in said different modes of operation to said one of said networks, if said accessed control signal traffic profile parameters of said mobile application do not exceed said received threshold limits for said associated said different modes of operation of said mobile application.

27. The computer implemented system of claim 19, wherein said network access module of said mobile application access component is configured to terminate access of said mobile application in said different modes of operation to said one of said networks, if said accessed control signal traffic profile parameters of said mobile application exceed said received threshold limits for said associated said different modes of operation of said mobile application.

28. The computer implemented system of claim 19, wherein said network access module of said mobile application access component is configured to switch access of said mobile application in said different modes of operation from said one of said networks to another of said networks, if said accessed control signal traffic profile parameters of said mobile application exceed said received threshold limits for said associated said different modes of operation of said mobile application.

29. The computer implemented system of claim 19, wherein said data reception module of said mobile application access component is further configured to receive a total threshold limit for each of said different modes of operation of a plurality of mobile applications implemented in said user device from said service entity, and wherein said parameter access module is further configured to determine a sum of said control signal traffic profile parameters embedded in said mobile applications for each of associated said different modes of operation, and wherein said comparison module is further configured to compare said determined sum of said control signal traffic profile parameters for said each of said associated said different modes of operation with said received total threshold limit for said each of said associated said different modes of operation of said mobile applications.

30. The computer implemented system of claim 29, wherein said mobile application access component further comprises a normalization module further configured to normalize said received total threshold limit for said each of said different modes of operation of said mobile applications with said determined sum of said control signal traffic profile parameters of said mobile applications in said associated said different modes of operation.

31. The computer implemented system of claim 29, wherein said network access module of said mobile application access component is further configured to grant access of said mobile applications in said different modes of operation to said one of said networks, if said determined sum of said control signal traffic profile parameters of said mobile applications for said each of associated said different modes of operation does not exceed said received total threshold limit for said each of said associated said different modes of operation of said mobile applications.

32. The computer implemented system of claim 29, wherein said data reception module of said mobile application access component is further configured to receive user inputs from said user device to terminate access of one or more of said mobile applications in said different modes of operation to said one of said networks, if said determined sum of said control signal traffic profile parameters of said mobile applications exceeds said received total threshold limit for said each of said associated said different modes of operation of said mobile applications.

33. The computer implemented system of claim 29, wherein said data reception module of said mobile application access component is further configured to receive user inputs from said user device to switch access of said one or more of said mobile applications in said different modes of operation from said one of said networks to another of said networks, if said determined sum of said control signal traffic profile parameters of said mobile applications exceeds said received total threshold limit for said each of said associated said different modes of operation of said mobile applications.

34. The computer implemented system of claim 19, wherein said mobile application access component further comprises a notification module configured to generate and transmit notifications to said user device for indicating actions associated with said management of said selective access of said mobile application in said different modes of operation to said one of said networks.

35. A computer program product comprising a non-transitory computer readable storage medium, said non-transitory computer readable storage medium storing computer program codes that comprise instructions executable by at least one processor, said computer program codes comprising:
   a first computer program code for processing a control signal request to access one of a plurality of networks, transmitted by a mobile application to a service provider;
   a second computer program code for receiving threshold limits for different modes of operation of said mobile application from a service entity;
   a third computer program code for accessing control signal traffic profile parameters embedded in said mobile application, said control signal traffic profile parameters defining a control signal traffic profile of said mobile application;
   a fourth computer program code for normalizing said received threshold limits for said different modes of operation of said mobile application with said accessed control signal traffic profile parameters of said mobile application in associated said different modes of operation;
   a fifth computer program code for comparing said accessed control signal traffic profile parameters with said normalized threshold limits for said associated said different modes of operation of said mobile application; and
   a sixth computer program code for managing said selective access of said mobile application in said different modes of operation to said one of said networks based on said comparison of said accessed control signal traffic profile parameters with said normalized threshold limits for said associated said different modes of operation of said mobile application.

36. The computer program product of claim 35, wherein said control signal traffic profile parameters comprise:
   an active control signal traffic profile parameter for said mobile application in an active mode of operation of said mobile application, wherein said active control signal traffic profile parameter is configured to store an aggregated value of said control signal traffic data per unit time for said mobile application in said active mode of operation; and
   a dormant control signal traffic profile parameter for said mobile application in a dormant mode of operation of said mobile application, wherein said dormant control signal traffic profile parameter is configured to store an aggregated value of said control signal traffic data per unit time for said mobile application in said dormant mode of operation.

* * * * *